(12) United States Patent
Hoff

(10) Patent No.: US 9,286,646 B1
(45) Date of Patent: Mar. 15, 2016

(54) METHOD FOR MANAGING CENTRALIZED POWER GENERATION WITH THE AID OF A DIGITAL COMPUTER

(71) Applicant: Clean Power Research, L.L.C., Napa, CA (US)

(72) Inventor: Thomas E. Hoff, Napa, CA (US)

(73) Assignee: CLEAN POWER RESEARCH, L.L.C., Napa, CA (US)

( * ) Notice: Subject to any disclaimer, the term of this patent is extended or adjusted under 35 U.S.C. 154(b) by 261 days.

(21) Appl. No.: 13/936,118

(22) Filed: Jul. 5, 2013

(51) Int. Cl.
  *G06Q 30/02* (2012.01)
  *G06Q 50/06* (2012.01)
  *H02J 3/38* (2006.01)
  *H02J 3/00* (2006.01)

(52) U.S. Cl.
  CPC ............ *G06Q 50/06* (2013.01); *G06Q 30/0202* (2013.01); *H02J 3/383* (2013.01); *H02J 2003/007* (2013.01); *Y02E 10/50* (2013.01); *Y04S 10/54* (2013.01)

(58) Field of Classification Search
  CPC ....... H02J 3/383; H02J 2003/007; H02J 3/32; Y02E 10/563; Y02E 60/76; Y02E 10/50; G01W 1/12; Y04S 10/54; Y04S 40/22; G06Q 10/04; G06Q 50/04; G06Q 50/06
  See application file for complete search history.

(56) References Cited

U.S. PATENT DOCUMENTS

| | | | |
|---|---|---|---|
| 5,001,650 A | 3/1991 | Francis et al. | |
| 5,602,760 A | 2/1997 | Chacon et al. | |
| 7,742,897 B2 | 6/2010 | Herzig | |
| 8,335,649 B1 | 12/2012 | Hoff | |
| 8,437,959 B2 | 5/2013 | Hoff | |
| 9,007,460 B2 | 4/2015 | Schmidt et al. | |
| 2005/0055137 A1* | 3/2005 | Andren et al. | ................ 700/291 |
| 2007/0084502 A1 | 4/2007 | Kelly et al. | |

(Continued)

OTHER PUBLICATIONS

Shahab Poshtkouhi et al., A General Approach for Quantifying the Benefit of Distributed Power Electronics for Fine Grained MPPT in Photovoltaic Applications Using 3-D Modeling, Nov. 2012, IEEE Transactions on Power Electronics, vol. 27, No. 11, p. 4656-4666.*

(Continued)

*Primary Examiner* — Ivan R Goldberg
*Assistant Examiner* — Matthew H Divelbiss
(74) *Attorney, Agent, or Firm* — Patrick J.S. Inouye

(57) ABSTRACT

Value of solar (VOS) analysis begins with the observation that photovoltaic power production represents a unique form of energy resource that is indifferent to demand and price signals. Accurate VOS assessment requires consideration of technical and economic components. The technical analysis predicts future central power generation requirements, as reflected by estimated customer demand, using an energy balance approach. A customer demand forecasting equation with three unknown values, distributed photovoltaic power production, centralized power generation, and losses associated with the centralized power generation, is solved by applying key rational assumptions in combination with historical data of centralized power generation and distributed photovoltaic power production. The solution to the demand equation is then provided with economic data, such as avoided fuel cost, avoided plant operations and maintenance cost, avoided generation capacity cost, avoided reserve capacity cost, avoided transmission and distribution capacity cost, fuel price guarantee value, and avoided environmental cost.

32 Claims, 8 Drawing Sheets

(56) References Cited

U.S. PATENT DOCUMENTS

| | | | |
|---|---|---|---|
| 2008/0258051 | A1 | 10/2008 | Heredia et al. |
| 2010/0219983 | A1 | 9/2010 | Peleg et al. |
| 2011/0137591 | A1* | 6/2011 | Ishibashi ............... 702/60 |
| 2011/0276269 | A1* | 11/2011 | Hummel ............... 702/3 |
| 2011/0282601 | A1* | 11/2011 | Hoff ............... 702/60 |
| 2011/0282602 | A1* | 11/2011 | Hoff ............... 702/60 |
| 2011/0295506 | A1* | 12/2011 | Hoff ............... 702/3 |
| 2011/0307109 | A1* | 12/2011 | Sri-Jayantha ............... 700/291 |
| 2014/0039709 | A1* | 2/2014 | Steven et al. ............... 700/291 |

OTHER PUBLICATIONS

Pathomthat Chiradeja et al., An Approach to Quantify the Technical Benefits of Distributed Generation, Dec. 2004, IEEE Transactions on Energy Conversion, vol. 19, No. 4, p. 764-773.*

Mudathir Funsho Akorede et al, Distributed energy resources and benefits to the environment, 2010, Renewable and Sustainable Energy Reviews 14, p. 724-734.*

V.H. Mendez, et al., Impact of distributed generation on distribution investment deferral, 2006, Electrical Power and Energy Systems 28, p. 244-252.*

Fracisco M. Gonzalez-Longatt et al., Impact of Distributed Generation over Power Losses on Distribution System, Oct. 2007, Electrical Power Quality and Utilization, $9^{th}$ International Conferece.*

M. Begović et al., Impact of Renewable Distributed Generation on Power Systems, 2001, Proceedings of the 34th Hawaii International Conference on System Sciences, p. 1-10.*

M. Thomson et al., Impact of widespread photovoltaics generation on distribution systems, Mar. 2007, IET Renew. Power Gener., vol. 1, No. 1 p. 33-40.*

Varun et al., LCA of renewable energy for electricity generation systems—A review, 2009, Renewable and Sustainable Energy Reviews 13, p. 1067-1073.*

Andreas Schroeder, Modeling storage and demand management in power distribution grids, 2011, Applied Energy 88, p. 4700-4712.*

Daniel S. Shugar, Photovoltaics in the Utility Distribution System: The Evaluation of System and Distributed Benefits, 1990, Pacific Gas and Electric Company Department of Research and Development, p. 836-843.*

Brinkman et al., "Toward a Solar-Powered Grid." IEEE Power & Energy, vol. 9, No. 3, May/Jun. 2011.

California ISO. Summary of Preliminary Results of 33% Renewable Integration Study—2010 CPUC LTPP, May 10, 2011.

Ellis et al., "Model Makers." IEEE Power & Energy, vol. 9, No. 3, May/Jun. 2011.

Danny et al., "Analysis of solar heat gain factors using sky clearness index and energy implications." Energy Conversions and Management, Aug. 2000.

Hoff et al., "Quantifying PV Power Output Variability." Solar Energy 84 (2010) 1782-1793, Oct. 2010.

Hoff et al., "PV Power Output Variability: Calculation of Correlation Coefficients Using Satellite Insolation Data." American Solar Energy Society Annual Conference Proceedings, Raleigh, NC, May 18, 2011.

Kuszamaul et al., "Lanai High-Density Irradiance Sensor Network for Characterizing Solar Resource Variability of MW-Scale PV System." 35th Photovoltaic Specialists Conference, Honolulu, HI. Jun. 20-25, 2010.

Serban C., "Estimating CLear SKy Solar Global Radiation Using Clearness Index, for Brasov Urban Area".

Mills et al., "Dark Shadows." IEEE Power & Energy, vol. 9, No. 3, May/Jun. 2011.

Mills et al., "Implications of Wide-Area Geographic Diversity for Short-Term Variability of Solar Power." Lawrence Berkeley National Laboratory Technical Report LBNL-3884E.

Perez et al., "Parameterization of site-specific short-term irradiance variability." Solar Energy, 85 (2011) 1343-1345, Nov. 2010.

Perez et al., "Short-term irradiance variability correlation as a function of distance." Solar Energy, Mar. 2011.

Philip, J. "The Probability Distribution of the Distance Between Two Random Points in a Box." www.math.kth.se/~johanph/habc.pdf. Dec. 2007.

Stein, J., "Simulation of 1-Minute Power Output from Utility-Scale Photovoltaic Generation Systems." American Solar Energy Society Annual Conference Proceedings, Raleigh, NC, May 18, 2011.

Solar Anywhere, 2011. Web-Based Service that Provides Hourly, Satellite-Derived Solar Irradiance Data Forecasted 7 days Ahead and Archival Data back to Jan. 1, 1998. www.SolarAnywhere.com.

Stokes et al., "The atmospheric radiation measurement (ARM) program: programmatic background and design of the cloud and radiation test bed." Bulletin of American Meteorological Society vol. 75, No. 7, pp. 1201-1221, Jul. 1994.

Hoff et al., "Modeling PV Fleet Output Variability," Solar Energy, May 2010.

Olopade et al., "Solar Radiation Characteristics and the performance of Photovoltaic (PV) Modules in a Tropical Station." Journal Sci. Res. Dev. vol. 11, 100-109, 2008/2009.

Li et al. "Analysis of solar heat gain factors using sky clearness index and energy implications." 2000.

* cited by examiner

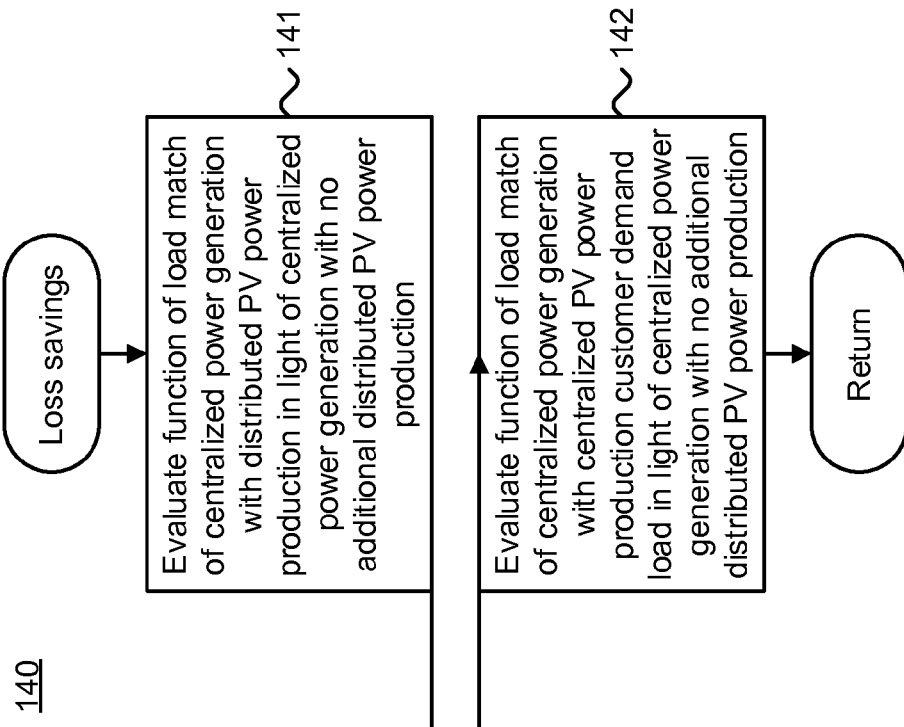
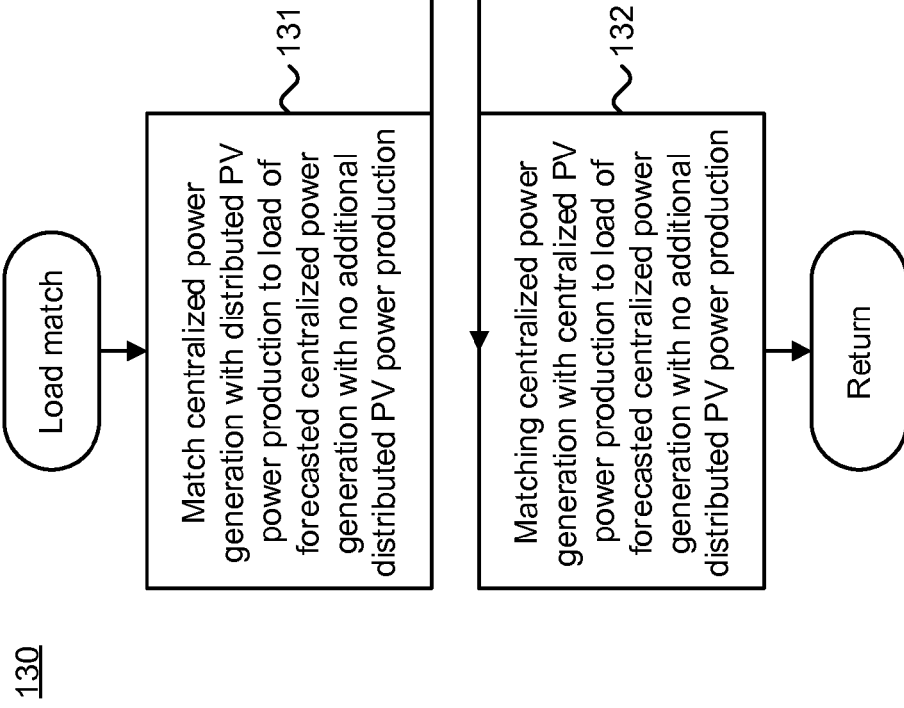

METHOD FOR MANAGING CENTRALIZED POWER GENERATION WITH THE AID OF A DIGITAL COMPUTER

FIELD

This application relates in general to power generation planning and operation and, in particular, to a method for managing centralized power generation with the aid of a digital computer.

BACKGROUND

Photovoltaic power production capacity continues to grow at a significant rate in part due to a growing demand for renewable energy resources in the United States and abroad. Distributed photovoltaic systems that operate independently from and centralized photovoltaic systems that operate adjunctively to traditional centralized power generation facilities have both contributed to this growth in capacity, although a substantial portion of the capacity growth can be directly attributed to the efforts of private individuals and businesses that are installing distributed photovoltaic systems to satisfy their own power demands off-grid.

Grid connection of distributed photovoltaic power production fleets is a fairly recent development, beginning with the Energy Policy Act of 1992, which deregulated power utilities and mandated the opening of access to power grids by outsiders. Power grid operators are still adapting to this change. Under the traditional pre-1992 grid power generation model, a power grid functioned as a centrally-located monotonic electricity generation, transmission, and distribution infrastructure that unidirectionally delivered power from suppliers to consumers. Today, however, operators of distributed photovoltaic systems are not wholly dependent upon power grid-supplied electric utilities. As a result, at least in the United States, these utilities have adopted the practice of using net metering to compensate their customers for private photovoltaic power production. Under net metering, private photovoltaic system operators typically receive a retail credit for at least a portion of the electricity that they generate, but do not directly consume, in exchange for the excess electricity provided to the power grid. However, while readily calculable, net metering does not scale in proportion to expected growth in photovoltaic production and fails to present a sustainable long-term solution to compensating customers for private off-grid photovoltaic power production.

Value of Solar (VOS) analysis provides an alternative approach to net metering for compensating customers for their private photovoltaic power production. VOS analysis is based on an assessment of the value of distributed photovoltaic production that is expected to be realized by the utility over the long term. However, there is an inherent tension between the value realized versus the cost of generating electric power. Value increases with proximity to consumption because losses are minimized, delivery costs are reduced, and other benefits are realized. On the other hand, cost decreases with distance away from consumption because power generation can take advantage of the economies of scale by being concentrated in one location. As a result, value realized is highest for distributed (on-site to customer) photovoltaic power production, while cost of generating electric power is lowest for centralized (off-site from customer) power generation.

To date, VOS analysis has not been well-defined. Effective VOS evaluation requires time- and location-specific photovoltaic power production data that correlates to utility power generation particulars. The photovoltaic modeling to produce such high-quality solar resource power production data has historically been difficult to obtain. As well, the nature of the problem of accurately assessing the value components of the VOS analysis requires expertise from diverse disciplines that include distribution planning, generation planning, regional renewable energy markets, and engineering economics. As a result, outside expertise and costly consulting engagements are necessary to develop VOS analysis methodologies, encode spreadsheet models, form consensus within the different internal utility organizations, and write reports.

Therefore, a need remains for an approach to assessing the long-term value of photovoltaic power production, particularly when distributed.

SUMMARY

Value of solar (VOS) analysis begins with the observation that photovoltaic power production represents a unique form of energy resource that is indifferent to demand and price signals. Accurate VOS assessment requires consideration of technical and economic components. The technical analysis predicts future central power generation requirements, as reflected by estimated customer demand, using an energy balance approach. A customer demand forecasting equation with three unknown values, distributed photovoltaic power production, centralized power generation, and losses associated with the centralized power generation, is solved by applying key rational assumptions in combination with historical data of centralized power generation and distributed photovoltaic power production. The solution to the demand equation is then provided with economic data, such as avoided fuel cost, avoided plant operations and maintenance cost, avoided generation capacity cost, avoided reserve capacity cost, avoided transmission and distribution capacity cost, fuel price guarantee value, and avoided environmental cost.

One embodiment provides a computer-implemented method for quantifying the impact of distributed photovoltaic power production on centralized power generation. A time series of readings of centralized power generation recorded at regular intervals over an initial period of power consumption are obtained. A time series of readings of distributed photovoltaic power production also recorded at the regular intervals over the initial period are obtained. Losses associated with the centralized power generation are determined. The centralized power generation readings and the distributed photovoltaic power production readings are equated as reflective of initial customer demand. Customer demand is estimated, beginning with the initial period, over a plurality of successive forecast periods. For each forecast period, the distributed photovoltaic power production is proportionately increased over the prior forecast period and distributed photovoltaic power production at each regular interval for the forecast period is forecast. The losses associated with the centralized power generation are proportionately increased over the prior forecast period and losses at each regular interval for the forecast period are forecast. The customer demand is proportionately increased over the prior forecast period and centralized power generation with distributed photovoltaic power production is forecast to meet the increased customer demand at each regular interval for the forecast period, less the forecasted distributed photovoltaic power production plus the forecasted losses, both at each corresponding regular interval of the forecast period.

The VOS analysis approach is transparent and comprehensible by non-expert users while producing accurate customer demand forecasting results for experts and power generation professionals. The approach recognizes when simplifying assumptions can be made and, as a result, embodies a simple-yet-not-simplistic methodology, as implicit in the rational assumptions of future demand, distributed photovoltaic production and losses growth. Thus, VOS can be quantified in a manner that enables objective and transparent analysis, established methodologies and correlated solar data, which synergistically empowers end-user recipients of the analysis.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

BRIEF DESCRIPTION OF THE DRAWINGS

FIG. 12 is a flow diagram showing a routine for performing load balancing for use in the method of FIG. 3.

FIG. 13 is a flow diagram showing a routine for determining loss savings for use in the method of FIG. 3.

DETAILED DESCRIPTION

Today, electricity delivered over a power grid can, and often does, originate from a range of divergent power sources. These sources include electromechanical power generators driven by chemical combustion, nuclear fission or kinetic energy; geothermal power; and biomass conversion, as well as renewable power producers that rely on natural resources, such as solar irradiance, wind, hydropower, tides, and geothermal heat. Renewable power producers have become increasingly attractive alternatives to traditional fossil and nuclear fuel-reliant power generation sources, due to worries over climate change, skyrocketing petroleum costs and the need to protect the environment. However, the value of integrating renewable power producers, particularly photovoltaic power production, can be difficult to quantify.

Figure 1:
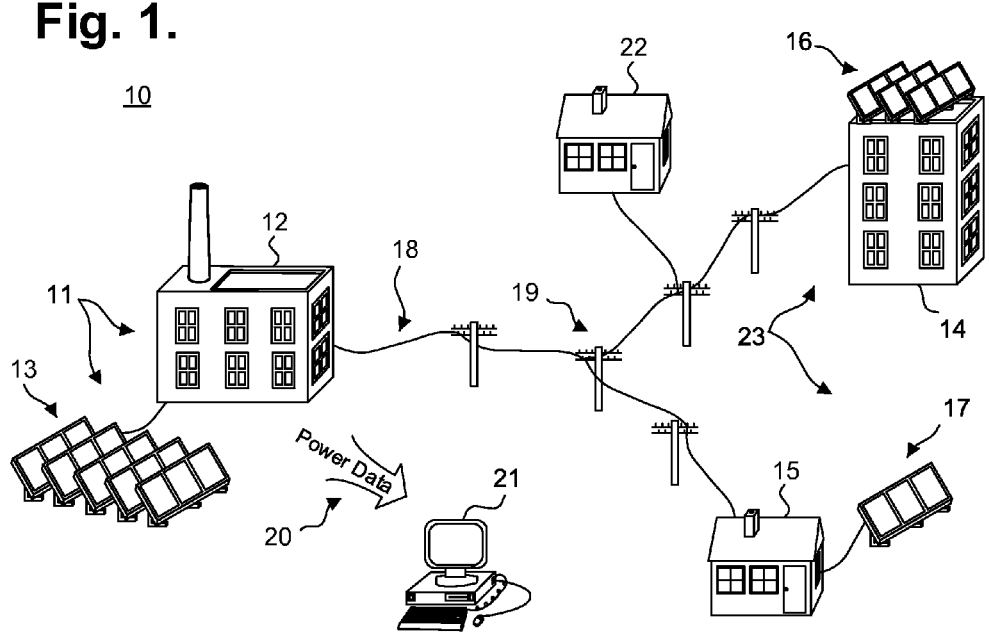
FIG. 1 is a flow diagram showing a computer-implemented system for quantifying the impact of distributed photovoltaic power production on centralized power generation, in accordance with one embodiment.

Net metering has been used by electric utilities as a way to compensate customers for excess electric production that has been provided back to a power grid from a distributed photovoltaic power production fleet. Net metering, though, does not scale to the levels of growth expected to be necessary to satisfy future power demands, and the power industry has been looking to Value of Solar (VOS) analysis as a viable alternative to quantifying photovoltaic power production contributions. FIG. 1 is a flow diagram showing a computer-implemented system 10 for quantifying the impact of distributed photovoltaic power production on centralized power generation, in accordance with one embodiment. A VOS analysis can be performed via the system 10 by evaluating power generation and production data 20 provided to a computer system 21, as further described infra beginning with reference to FIG. 3. The computer system 21 includes hardware components conventionally found in a general purpose programmable computing device, such as a central processing unit, memory, user interfacing means, such as a keyboard, mouse, and display, input/output ports, network interface, and non-volatile storage, and execute software programs structured into routines, functions, and modules for execution on the various systems. In addition, other configurations of computational resources, whether provided as a dedicated system or arranged in client-server or peer-to-peer topologies, and including unitary or distributed processing, communications, storage, and user interfacing, are possible.

The power data 20 includes historical time series utility-generated power data for a centralized power generation utility 11, which may include both a conventional form of non-renewable energy power generation plant 12 and a co-located photovoltaic power production fleet 13. The power data 20 also includes historical time series photovoltaic fleet-produced power data for a distributed photovoltaic power production resource 23 that can include one or more individual photovoltaic power production fleets 16, 17 operated by private customers 14, 15 of the utility 11.

Historically, demand for electric power has been satisfied by generating electricity centrally, such as through a centralized power generation utility 11, then delivering the electricity to customers 14, 15, 22 through a system of transmission 18 and distribution 19 lines. Alternative approaches are emerging to satisfy customer demand through distributed energy resources, which include using energy efficiency investments to reduce demand, using demand response or storage to shift demand, and using distributed photovoltaic power production or distributed combined heat and power to satisfy demand locally. These alternatives are being introduced into a power supplying system, where demand for electricity has historically been satisfied by a single utility 11. Typically, the utility's monopoly position, at least on the transmission 18 and distribution 19 portion of the system 10, if not the whole process, is managed by public utility commissions who oversee the setting of rates and other activities. In this context, the question of the economic feasibility in the evaluation of alternatives to centrally-generated power arises, leading to the need for VOS analysis and other forms of economic feasibility study that necessarily requires combining economic information with detailed technical performance.

Table 1 presents the five alternative distributed energy resource approaches, energy efficiency, demand response, distributed storage, distributed combined heat and power, and distributed photovoltaic power production, in terms of: (1) whether implementation requires customer demand; and (2) whether

TABLE 1

| | Implementation Requires Demand | Temporal Price Signals Affect Real-Time Operation |
|---|---|---|
| Energy Efficiency | ✓ | Sometimes |
| Demand Response | ✓ | ✓ |
| Distributed Storage | ✓ | ✓ |
| Distributed Combined Heat and Power | ✓ | ✓ |
| Distributed Photovoltaic Power Production | No | No | temporal price signals affect resource operation. There is an affirmative answer to these two questions for the first four of the distributed energy resources. Energy efficiency requires demand and price signals will affect the operation of at least some energy efficiency investments. For instance, a programmable thermostat will respond to price signals, while a refrigerator will not. Demand response requires demand to exist. By way of example, an air conditioner can only be turned off if already operating, and price signals will affect the operation of the air conditioner. Last, distributed storage requires demand to exist, and distributed storage will be operated based on the price of power at different times. Distributed combined heat and power requires demand for the heat and will be operated based on price signals from the utility.

When compared to energy efficiency, demand response, distributed storage, and distributed combined heat and power, photovoltaic power production is unique. Photovoltaic power production does not follow the rule of economy of scale; capital cost is minimally influenced by facility size. The photovoltaic module is the fundamental building block used in all photovoltaic power systems, whether a small distributed photovoltaic system located on private residence or a large central photovoltaic fleet located in the desert. Moreover, distributed photovoltaic power production, in contrast to energy efficiency, demand response, distributed storage, and distributed combined heat and power, neither requires customer demand nor alters the manner in which a photovoltaic plant is operated in response to price signals. Rather, the operator of a photovoltaic system only has two decisions to make. First, how should the photovoltaic system be configured upon installation? Second, how should the photovoltaic system be maintained? Configuration includes size, location, and orientation of the photovoltaic system. Anticipated demand and price signals only influence the initial configuration decision, not follow-on operation, as system performance is independent of actual demand after installation, and excess production can be exported to the grid, regardless of demand. Likewise, photovoltaic system operation is unaffected by price signals, as power is produced at a cost uninfluenced by the supply-and-demand chain of a power grid.

Figure 2:
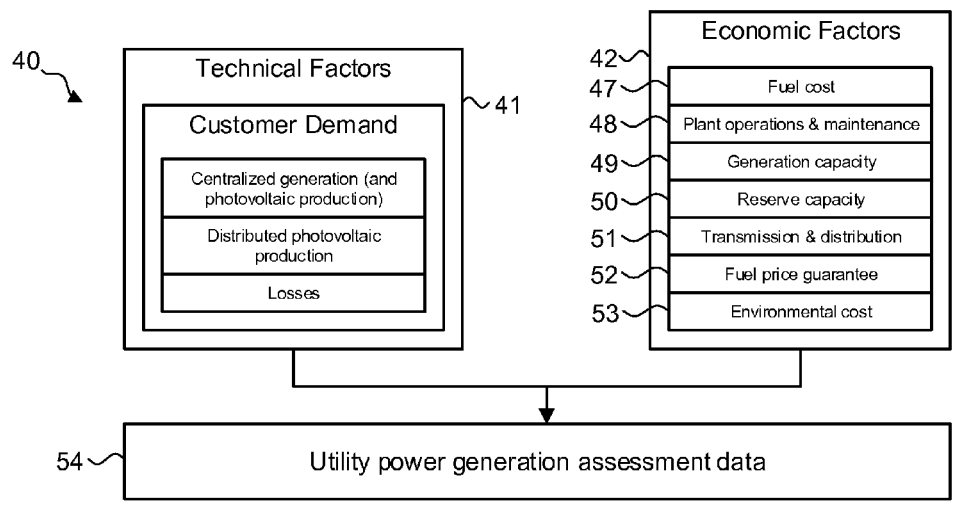
FIG. 2 is a data flow diagram showing, by way of example, the production of utility power generation assessment data.

A critical distinction can be made between a distributed photovoltaic power production resource 23 and other forms of distributed energy resources. Distributed photovoltaic power production's lack of a need for customer demand and lack of response to real-time price signals leads to a foundational observation that VOS analysis can be separated into distinct sets of economic and technical factors. FIG. 2 is a data flow diagram showing, by way of example, the production 40 of utility power generation assessment data 54. VOS analysis can be constructed by assessing economic factors 42 applicable to an "Ideal Resource," which, for purposes of evaluating VOS, is defined to be a dispatchable resource having the same capacity factor as the photovoltaic power production resource 23 under consideration. The economic factors 42 are modified by technical factors 41 that reflect the effect of photovoltaic power production, both distributed and centralized, on the utility's power generation. The effect of the technical factors 41 on the economic factors 42 is referred to as the "Load Match," as further described infra with reference to FIG. 12. In addition, "Loss Savings," as further described infra with reference to FIG. 13, reflect the distributed aspect of a photovoltaic power production resource 23, in contrast to the centralized nature of a traditional power generation utility 11.

The VOS analysis framework rests on two fundamental questions. First, what benefits should be included? The answer requires defining the benefits, identifying the recipients, and making a selection as to what should be included in the analysis. Second, how should the benefits be calculated? The answer requires defining methodology and selecting input assumptions.

Answering the first question, what benefits should be included, begins with the general observation that the utility, ratepayers and taxpayers will be the likely the recipients of any benefits included as the economic factors 42 in the VOS analysis. A non-comprehensive list of values that benefit these recipients is provided in Table 2 and includes avoided fuel costs 47, avoided plant operations and maintenance costs 48, avoided generation capacity costs 49, avoided reserve capacity costs 50, avoided transmission and distribution costs 51, fuel price guarantee value 52, and avoided environment costs 53. The foregoing list of values is merely illustrative and other costs avoided, savings realized, or quantifiable values that accrue to the benefit of the utility, ratepayer, taxpayers, or others, are possible. Each value will now be discussed at a high level and in greater detail infra.

Distributed photovoltaic power production offsets the costs incurred by a utility 11 in generating power and reduces a utility's electricity purchases or generation. Distributed photovoltaic power production also reduces electrical losses by producing the power at the point of consumption. As a result, fuel costs are avoided, such as where the purchasing of natural gas fuel that would have otherwise been required to operate a gas turbine can be reduced. The calculation methodology of avoided fuel costs 47 is the same whether the utility 11 avoids fuel purchases or reduces wholesale power purchases.

The utility 11 realizes a savings in plant operations and maintenance costs due to decreased use of the gas turbine. The avoided plant operations and maintenance cost savings 48 are proportional to the avoided energy, including loss savings.

The total cost of power generated by the utility 11 includes the costs of fuel, plant operations and maintenance, and generation plant capital. Avoided generation capacity costs 49 are valued as the capital cost of generation displaced by the savings in the total cost of power generated as realized through the

TABLE 2

| Value Component | Basis |
|---|---|
| Utility Perspective | |
| Avoided Fuel Cost | Cost of natural gas fuel to operate a combined-cycle combustion gas turbine (CCGT) plant operating on the margin to meet electric loads and transmission and distribution line losses. |
| Avoided Plant O&M Cost | Costs associated with operations and maintenance of the CCGT plant. |
| Avoided Generation Capacity Cost | Capital cost of generation to meet peak load. |
| Avoided Reserve Capacity Cost | Capital cost of generation to meet planning margins and ensure reliability. |
| Avoided T&D Capacity Cost | Cost of money savings resulting from deferring transmission and distribution line capacity additions. |
| Avoided Environmental Cost | Cost to comply with environmental regulations and policy objectives. |
| Fuel Price Guarantee Value | Value of eliminating natural gas fuel price uncertainty. |
| Ratepayer/Taxpayer Perspective | |
| Economic Development Value | Enhanced tax revenues associated with net job creation for solar versus conventional power generation, as well as other benefits to the government. |
| Environmental Value | Future cost of mitigating environmental impacts of coal, natural gas, nuclear, and other generation. |
| Security Enhancement Value | Avoided economic impacts of outages due to increased grid reliability of distributed photovoltaic power production. |
| Market Price Reduction | Wholesale market costs incurred by all ratepayers associated with a shift in demand. Also known as the merit order effect or the demand reduction-induced price effect. | distributed photovoltaic power production resource 23. This component requires determining the need for power generation and the match between distributed photovoltaic power production and centralized power generation, including any photovoltaic power production co-located with the utility 11. Avoided generation capacity costs 49 are determined by first projecting future power generation with and without distributed photovoltaic power production and then comparing the results of the two scenarios.

A utility 11 must generally install additional generation capacity to satisfy reliability requirements in the event of forced plant outages. This reserve generation capacity is gauged by specifying a planning margin percentage above the amount of power generation capacity required to meet forecasted peak loads. Distributed photovoltaic power production reduces the peak loads and thus reduces the amount of reserve capacity required. Avoided reserve capacity costs 50 are proportional to avoided generation capacity cost 49.

A distributed photovoltaic power production resource 23 has the potential to defer transmission and distribution infrastructure investments. The savings from avoided transmission and distribution costs 51 approximately equal the costs of capital saved in the period between the installation of the distributed photovoltaic fleet 16, 17 and the time at which loads reach the level of effective photovoltaic power production capacity.

Photovoltaic power production is insensitive to natural gas or other fuel price volatility. As a result, distributed, as well as centralized, photovoltaic power production provides a guarantee against fuel price fluctuation. This value can be quantified by calculating the cost of a risk mitigation investment, known as a fuel price guarantee value 52, that provides price certainty for future fuel purchases.

Finally, photovoltaic power production has the potential to reduce costs that the utility incurs in satisfying environmental compliance goals or state laws. The avoided environment costs 53 are quantified only to the extent that savings are realized by the utility 11.

Answering the second question, how should the benefits be calculated, builds on the benefits listed in Table 1 and can be calculated with different methods that have varying levels of complexity. Complex methods dominate one end of the spectrum, while simplistic methods dominate the other end.

Complex methods have the advantage of being highly accurate, yet carry the disadvantages of lacking transparency and comprehensibility. For example, a traditional power utility resource planning approach to calculating avoided fuel cost involves running a multi-year hourly dispatch model, incorporating details about generating unit operating characteristics, transmission grid topology and constraints, and market system operations. Non-expert users must implicitly trust the model's results, as they are unable to audit analysis details.

On the other hand, simplistic methods have the advantages of being transparent and easy to understand by even non-expert users, but have the disadvantage of potentially producing inaccurate results. For instance, one set of simple methods simply multiply together several values. Users can readily audit the details of the analysis, but are unsure whether the results are correct.

Figure 3:
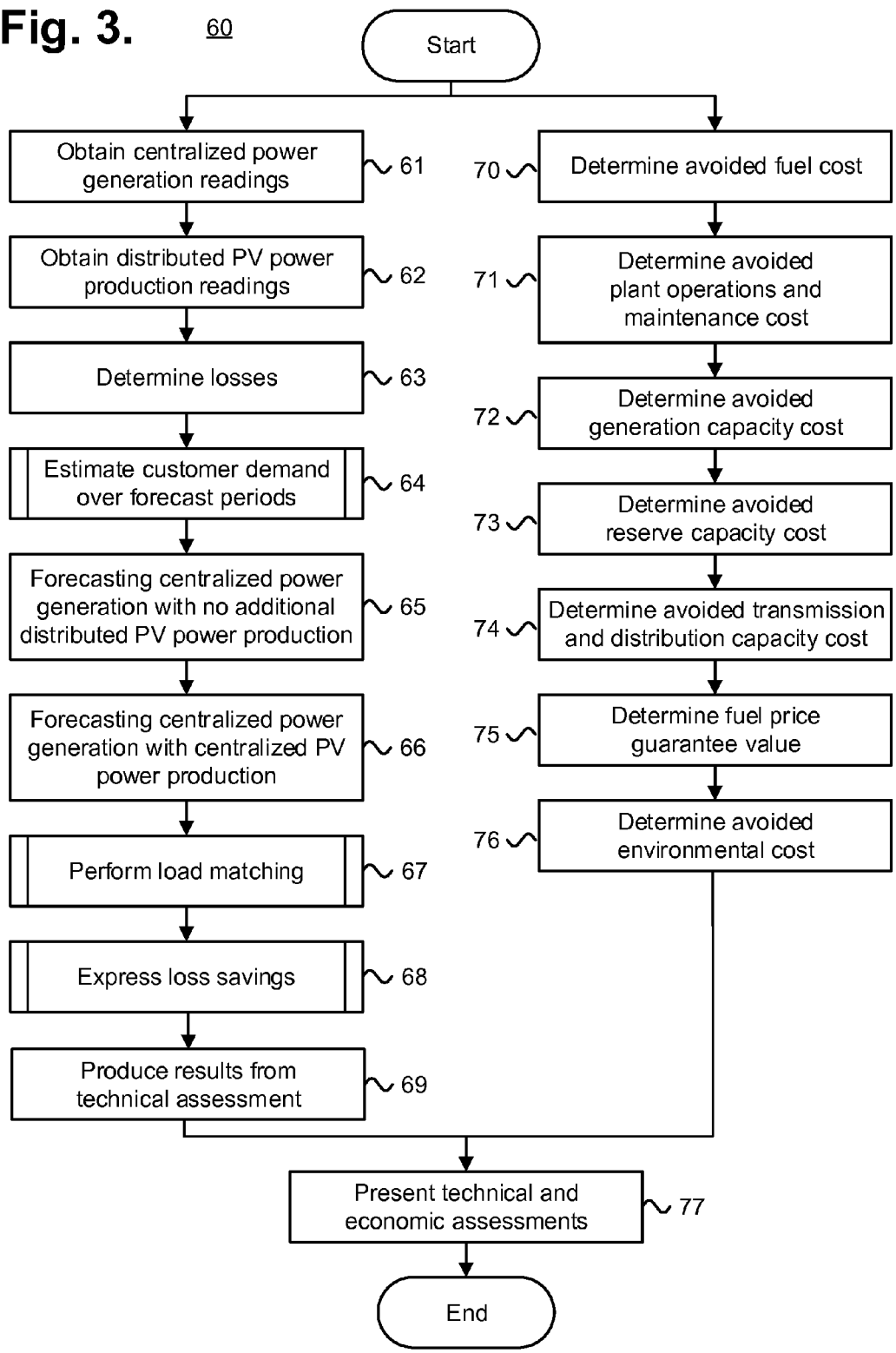
FIG. 3 is a flow diagram showing a computer-implemented method for quantifying the impact of distributed photovoltaic power production on centralized power generation, in accordance with one embodiment.

A simple-yet-not-simplistic approach is applied in calculating the benefits. The approach retains the advantages of both ends of the spectrum of complexity, while avoiding their respective disadvantages. FIG. 3 is a flow diagram showing a computer-implemented method 60 for quantifying the impact of distributed photovoltaic power production on centralized power generation, in accordance with one embodiment. The method 60 can be implemented in software and execution of the software can be performed on a computer system 21, such as described supra with reference to FIG. 1, as a series of process or method modules or steps.

The method 60 performs a VOS analysis in two separate but interrelated parts. A technical component (steps 61-69) reflects the effect of photovoltaic power production on centralized power generation. An economic component (steps 70-76) assesses economic factors applicable to an "Ideal Resource."

As a starting point in the technical component of the VOS analysis, a time series of historical readings of centralized power generation by the utility 11 is obtained (step 61) from the statistics. Central power generation statistics are typically recorded by the electric utility 11 on an on-going basis. Readings that have been recorded at regular intervals of time, such as one-hour intervals, over an initial period of power consumption are selected. At least one year's worth of hourly data is typically used to perform the VOS analysis, although more or less data could be used.

The centralized power generation readings reflects the actual or inferred power generation by a conventional form of non-renewable, that is, non-photovoltaic, energy power generation plant 12. If applicable, the centralized power generation readings may also reflect photovoltaic power production by a co-located photovoltaic power production fleet 13 (shown in FIG. 1) that is operating as part of the utility 11 with the time series of historical readings reflecting the combined output from centralized power generation and centralized photovoltaic power production.

Additionally, a time series of readings of distributed photovoltaic power production by the distributed photovoltaic power production resource 23 is obtained (step 62). The historical photovoltaic fleet power production can be measured or inferred photovoltaic production data. The distributed photovoltaic power production readings can be obtained from ground-based weather stations, existing photovoltaic systems, a satellite network, or some combination of sources, as well as from other sources. Preferably, the solar irradiance data from which the distributed photovoltaic power production readings are measured or derived is collected from several sample locations across the geographic region that encompasses the distributed photovoltaic power production resource 23. In a further embodiment, the historical photovoltaic fleet power production can be simulated using, for instance, numeric prediction models, based on historical solar resource data for the utility's geographic region, as further described infra with reference to FIG. 10. Other sources of the historical photovoltaic fleet power production are possible.

Accurately assessing the match between the centralized power generation utility 11 and the distributed photovoltaic power production resource 23 requires that the centralized power generation data and the photovoltaic power production data be both time- and location-correlated. The distributed photovoltaic power production readings must correspond to the same time intervals, and the distributed photovoltaic power production resource 23 must be located in the same geographic region as the utility 11.

Figure 4:
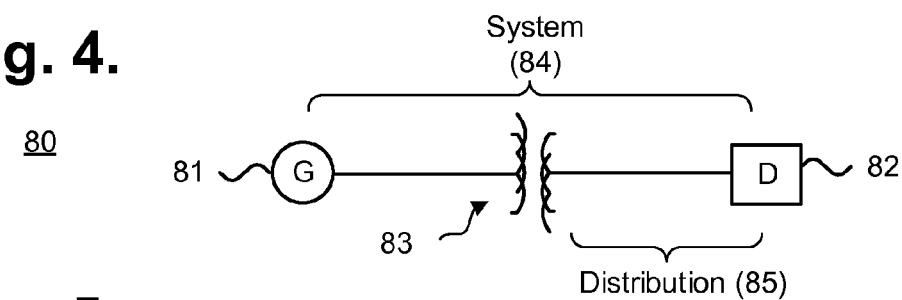
FIG. 4 is a block diagram showing, by way of example, losses associated with the centralized power generation.

The losses associated with centralized power generation are determined (step 63) from multiple perspectives. FIG. 4 is a block diagram showing, by way of example, losses 80 associated with the centralized power generation. A power utility generates electric power 81 ('G') that is provided to customers to satisfy end-user demand 82 ('D') over a system 83 of transmission and distribution lines. "System" losses 84 are incurred on both the transmission and distribution systems, as well as "distribution" losses 85 specific to the distribution system alone. Losses are applied differently depending upon the value component. For example, avoided fuel cost 47 represents a benefit originating at the point of centralized power generation, so that the total system losses 84 should be included. Avoided transmission and distribution capacity cost 51, on the other hand, represents a benefit as measured at a distribution substation and only the losses saved on the distribution system should be considered.

Figure 11:
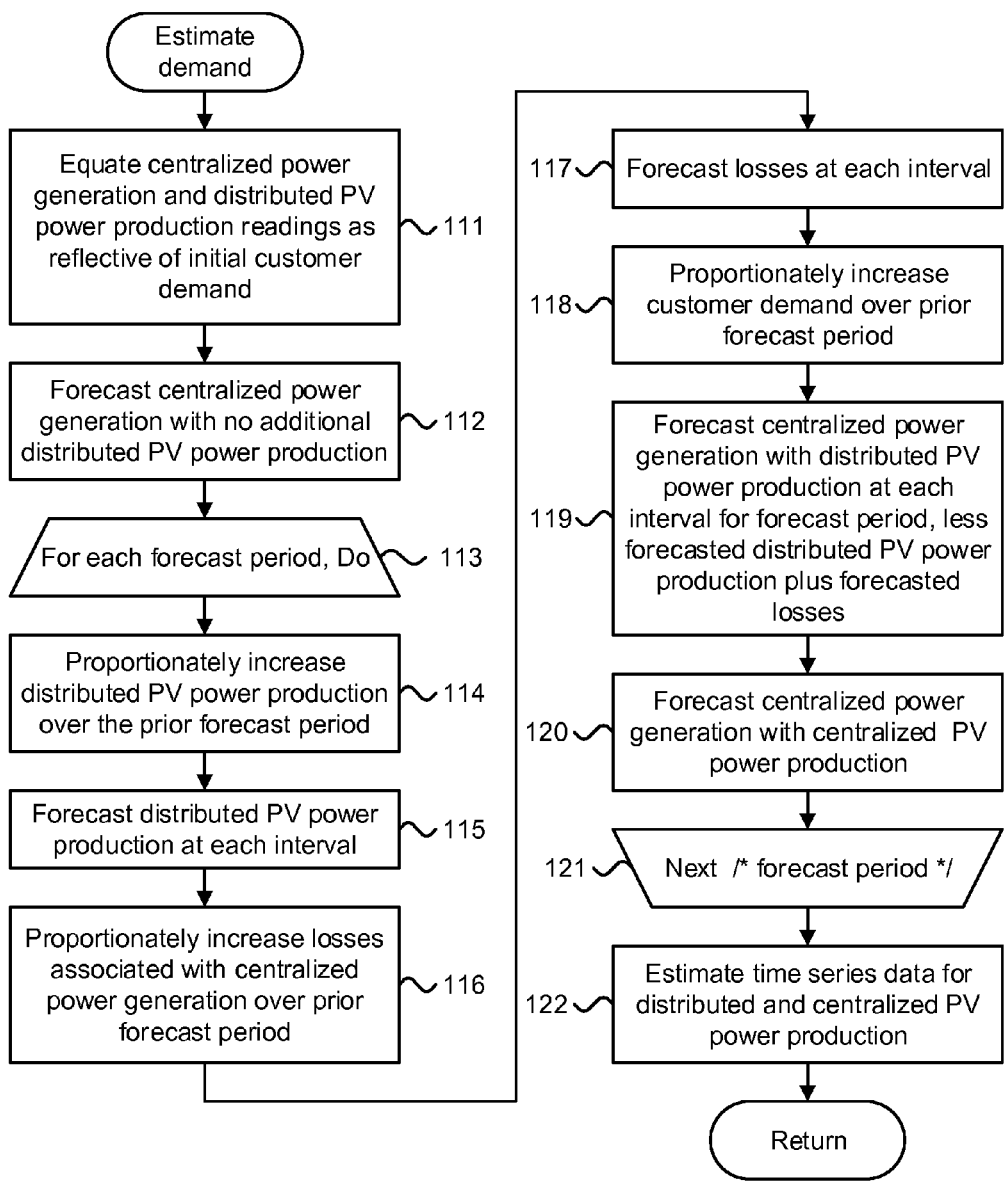
FIG. 11 is a flow diagram showing a routine for estimating customer demand over forecast periods for use in the method of FIG. 3.

Referring back to FIG. 3, customer demand for power over a forecast period generally covering several years hence is estimated (step 64), as further described infra with reference to FIG. 11. Customer demand is estimated using a simple-yet-not-simplistic energy balance approach. The energy balance approach can be contrasted to conventional approaches, which make simplistic assumptions that can produce inaccurate results.

One simplistic assumption is to equate utility power generation with customer demand. For purposes of illustration, assume that the utility's centralized power generation is 10,000 MW during the peak hour of the year, which results in ten-percent average load-related losses. The utility is evaluating distributed photovoltaic power production that has 1,000 MW output during the peak hour of the year. Assuming that utility power generation equates to customer demand implies that revised centralized power generation requirements will be for 9,000 MW after the addition of the 1,000 MW of distributed photovoltaic power production. However, this assumption fails to account for the effect of changes in losses. The distributed photovoltaic power production resource will be located near the points of consumption and will avoid the losses normally associated with centralized power generation. Therefore, the decrease in losses also decreases the centralized power generation requirements, and the utility's centralized power generation requirements will actually be reduced by more than 1,000 MW due to a reduction in losses.

Another simplistic assumption is that loss savings and average losses are the same. This assumption is more subtle and implies that distributed photovoltaic power production simply needs to be increased by average losses to correctly account for the effect of losses. In other words, losses are calculable by multiplying the distributed photovoltaic power production output by the average losses of ten percent, such that 1,000 MW of distributed photovoltaic power production output reduces centralized power generation by 1,100 MW.

Figure 5:
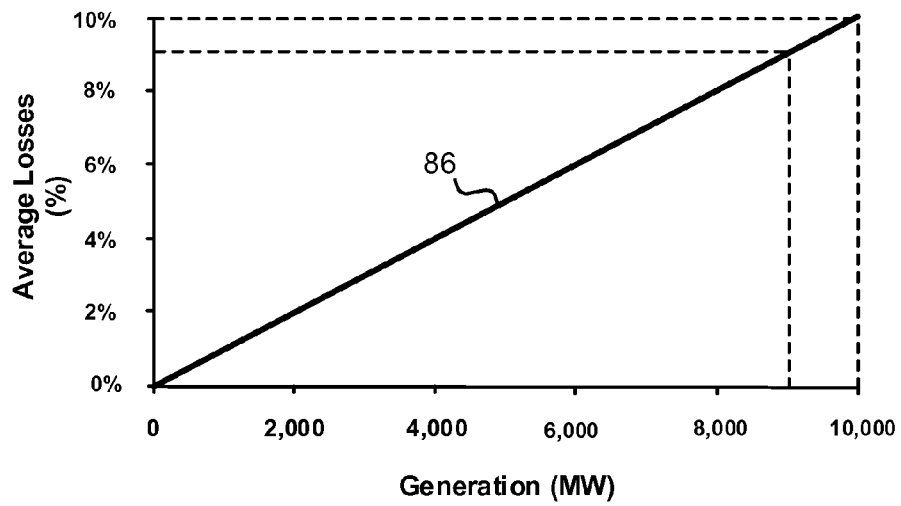
FIG. 5 is a graph showing, by way of example, average losses versus power generation for a centralized power generation utility.
Figure 6:
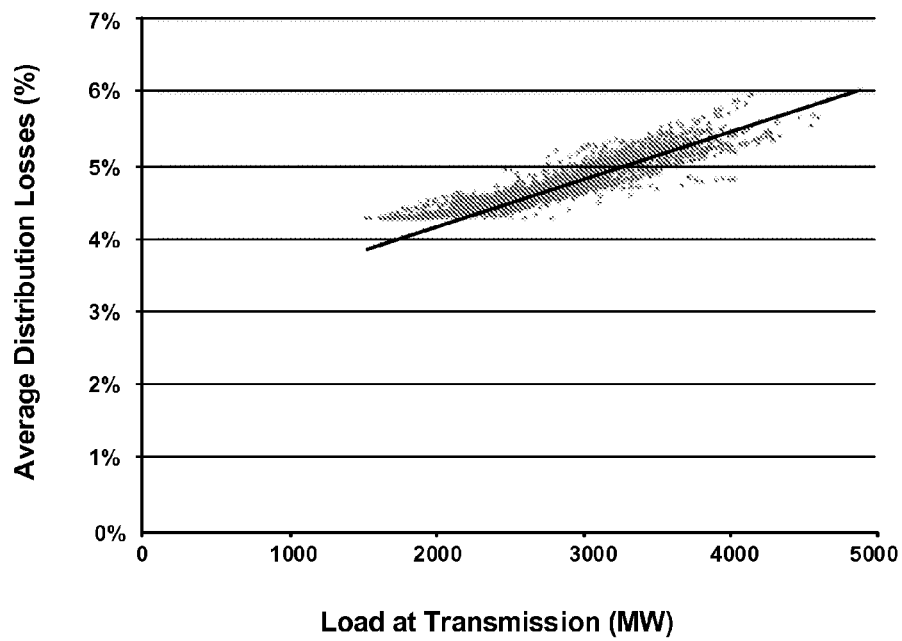
FIG. 6 is a graph showing, by way of example, the relationship between average losses and power generation for an actual centralized power generation utility.

This assumption, while appealing due to simplicity, produces incorrect results. FIG. 5 is a graph showing, by way of example, average losses versus power generation for a centralized power generation utility. The x-axis represents power generation in megawatts ("MW"). The y-axis represents average losses as a percentage of power generation. In this example, the implication that the utility has ten-percent average load-related losses at peak generation can be modeled as a linear relationship 86. Thus, total losses at 10,000 MW of power generation equal 1,000 MW, which is 10% average losses×10,000 MW, whereas total losses at 9,000 MW of power generation equal 810 MW, which is 9% Average Losses×9,000 MW. A 1,000 MW reduction in power generation translates to a 190 MW, that is, 1,000 MW−810 MW, reduction in losses, which corresponds to loss savings. The assumption that loss savings equal average losses, however, translates to loss savings of 100 MW. As a result, this assumption underestimates loss savings by almost a factor of two, 190 MW versus 100 MW. FIG. 6 is a graph showing, by way of example, the relationship between average losses and power generation for an actual centralized power generation utility based on data published by San Diego Gas and Electric Company (SDG&E) for its distribution system, available online at http://www.sdge.com/customer-choice/customer-choice/distribution-loss-factors.

The simple-yet-not-simplistic energy balance approach is derived from engineering principles and provides an accurate way to account for losses by recognizing that customer demand always equals centralized power generation minus losses plus distributed photovoltaic power production. Typically, only centralized power generation is measured by a utility 11, which means that other variables need to be estimated and then projected for the future forecasting. The approach is based on the following assumptions:

1) Future demand for electric power grows proportionally to current demand for electric power for any time of the year.
2) Future distributed photovoltaic power production grows proportionally to current distributed photovoltaic power production for any time of the year.
3) Average losses are proportional to central power generation output.

The foregoing assumptions are expressed in terms of a year, but other long term period of time could be used with equal affect. Similarly, the energy balance approach is explained in terms of hours and years, but other regular intervals of time and long term periods of time could also be used.

Figure 7:
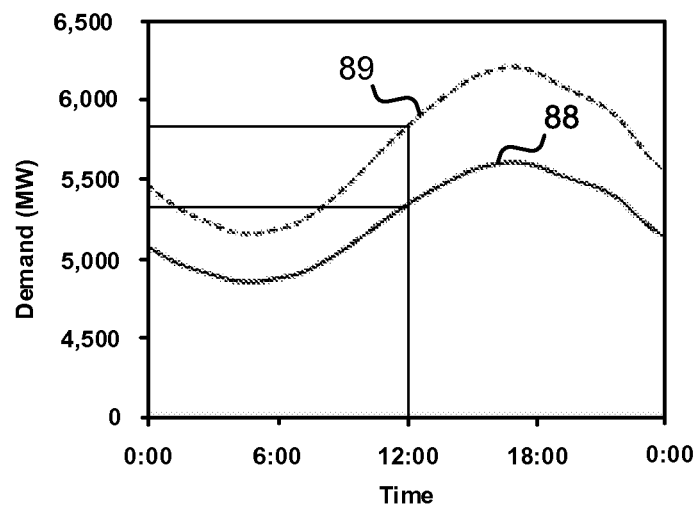
FIG. 7 is a graph showing, by way of example, future demand for power growing in proportion to present demand for power.

The first assumption means that demand growth at all times is represented by a single number. FIG. 7 is a graph showing, by way of example, future demand for power growing in proportion to present demand for power. The x-axis represents time of day. The y-axis represents demand in megawatts. Future demand is predicted by multiplying current demand times a term that is a function of this growth rate. For example, suppose that the annual demand growth is 7.5% per year. The demand curve 88 for Jun. 1, 2012 shows a demand of 5,350 MW at 12:00 pm. The proportional demand growth assumption implies that future demand will increase proportionately by 7.5% annually. As a result, the demand curve 89 for Jun. 1, 2013 shows a proportionately increased demand of 5,350 MW at 12:00 pm. Notwithstanding that weather patterns cannot be predicted accurately years into the future, representative data that retain the relationship between distributed photovoltaic power production and centralized power generation can be produced.

Figure 8:
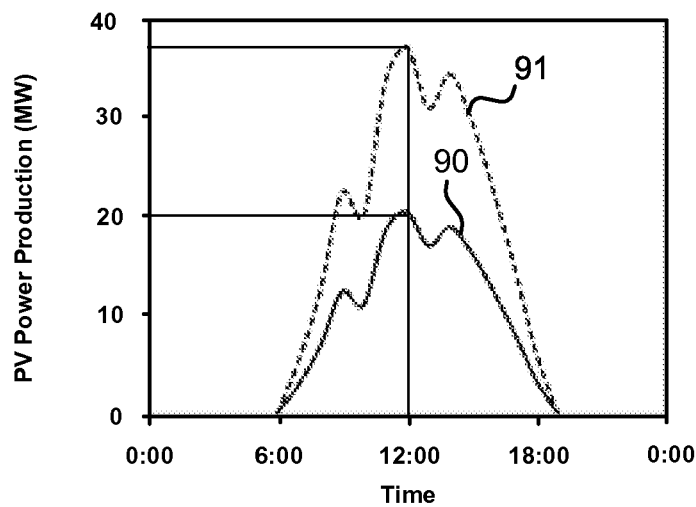
FIG. 8 is a graph showing, by way of example, current and future distributed photovoltaic power production.

The second assumption states that future distributed photovoltaic power production will be proportional to current distributed photovoltaic power production for any time of the year. FIG. 8 is a graph showing, by way of example, current and future distributed photovoltaic power production. The x-axis represents time of day. The y-axis represents distributed photovoltaic power production in megawatts. For example, suppose that the distributed photovoltaic power production resource grows by a factor of 1.9 each year. The distributed photovoltaic power production curve 90 for Jun. 1, 2012 shows an output of 20 MW at 12:00 pm. The proportional distributed photovoltaic power production growth assumption implies that future output will increase proportionately by a factor of 1.9 annually. As a result, the distributed photovoltaic power production curve 91 for Jun. 1, 2013 shows an output of 38 MW at 12:00 pm. This assumption holds true whether the photovoltaic power production output is based on measured photovoltaic power production or on photovoltaic power production simulated using time- and location-correlated solar resource data.

The third assumption states that average losses are proportional to central power generation, which follows from the observation that as centralized power generation grows proportionately to demand, the losses also increase in the same proportion. This assumption is based on Ohm's law, which states that voltage equals current times resistance. Since power equals current times voltage, power also equals current squared times resistance, that is, $P=I^2R$, which also represents losses associated with the centralized power generation.

Referring back to FIG. 3, the forecasted customer demand (step 64) includes a forecast of centralized power generation with distributed photovoltaic power production that is sufficient to meet the increased customer demand over the forecast period, as adjusted for forecasted distributed photovoltaic power production and forecasted losses. Two additional forecasts to meet the increased customer demand over the forecast period are made. First, centralized power generation with no additional distributed photovoltaic power production is forecasted (step 65) as a special case of the forecasted distributed photovoltaic power production, but adjusted by a forecast of distributed photovoltaic power production with no additional photovoltaic power production and the forecasted losses. Second, centralized power generation with centralized photovoltaic power production is forecasted (step 66) as the difference of the forecasted centralized power generation with no additional distributed photovoltaic power production and the forecasted centralized power generation with distributed photovoltaic power production.

These three forecasts, centralized power generation with distributed photovoltaic power production, centralized power generation with no additional distributed photovoltaic power production, and centralized power generation with centralized photovoltaic power production, are used as inputs to evaluate the projected match between photovoltaic power production, both distributed and centralized, and centralized (non-photovoltaic) power generation (or load) (step 67), as further described infra with reference to FIG. 12.

The load matching generates two results that respectively assume that the photovoltaic power production is distributed or centrally located, that is, co-located with the centralized power generation utility 11. These results are used to determine loss savings (step 68), as further described infra with reference to FIG. 13. Determining loss savings requires first performing a detailed hourly analysis of the match between the load and photovoltaic power production output, taking into account the effect on hourly losses. Values for an ideal resource are then generated based on variables that include heat rates and generation capacity cost. The results from load matching (step 67) and loss savings (step 68) are equally applicable to assess the match between photovoltaic power production and the transmission and distribution system loads.

Figure 9:
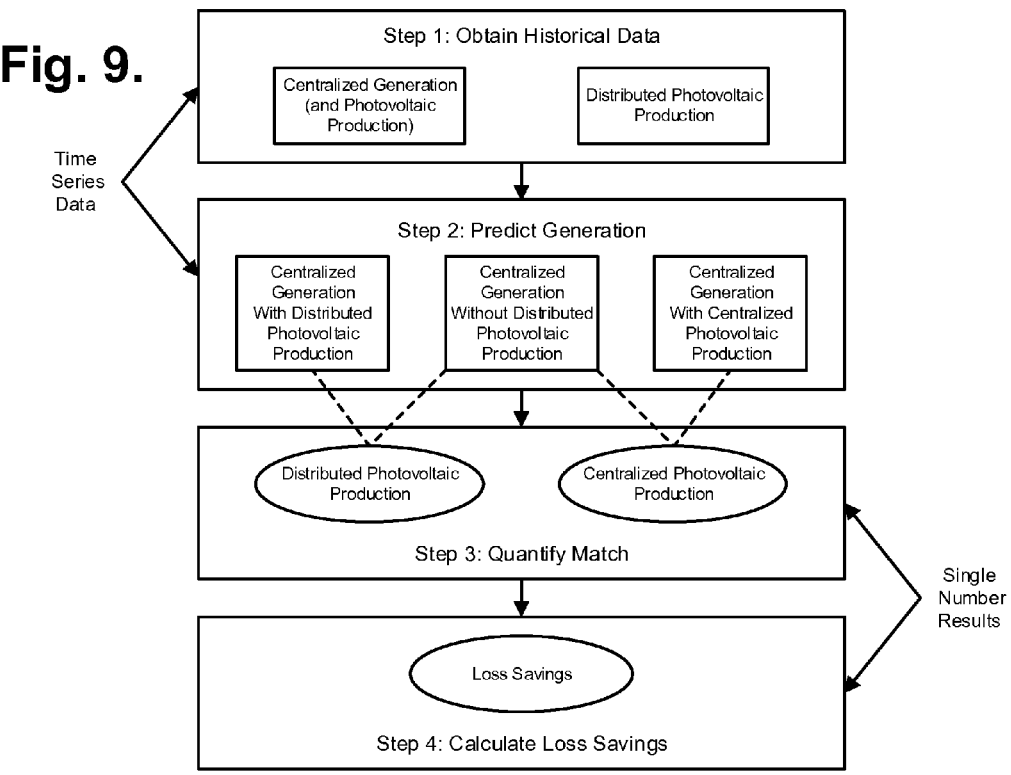
FIG. 9 is a data flow summarizing the steps performed for the technical components of the Value of Solar analysis.

Finally, the results from the technical assessment are assembled (step 69), as further discussed in detail infra. FIG. 9 is a data flow summarizing the steps performed for the technical components of the VOS analysis.

Whereas the technical component evaluates the effect of photovoltaic power production on centralized power generation, the economic component of the VOS analysis evaluates a non-comprehensive list of values that benefit these recipients of centralized power generation output, such as the utility, ratepayers and taxpayers. Consequently, other values could also be included as part of the economic component or some of the listed values could be omitted. The economic component will also be discussed in detail infra.

Figure 10:
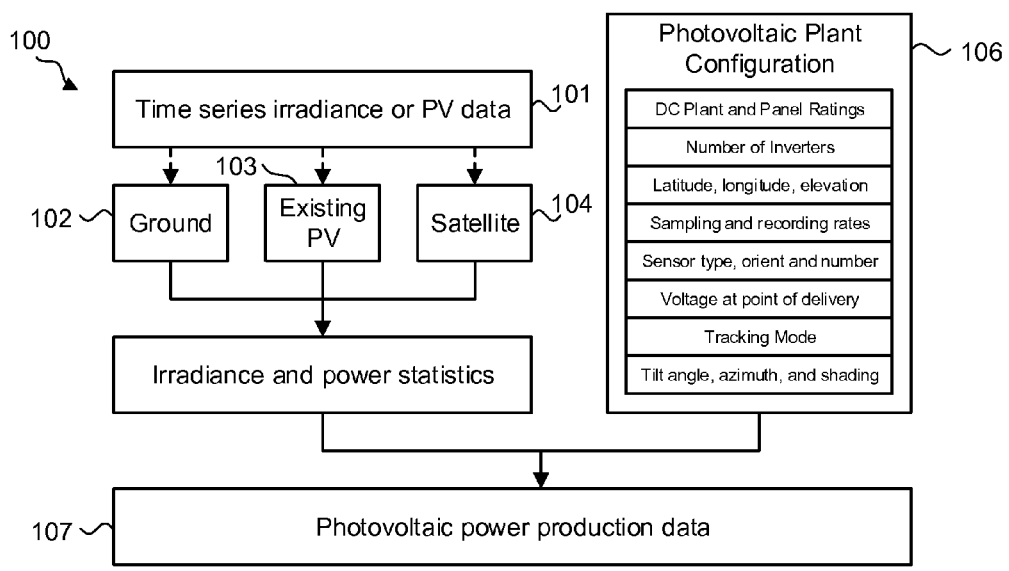
FIG. 10 is a data flow diagram showing, by way of example, the simulation of photovoltaic power production data.

Historical photovoltaic power production data that are time- and location-correlated with utility generation data are required to perform a VOS analysis. Measured historical photovoltaic power production data can be used, provided the data is time- and location-correlated, for instance, on the same hourly basis of measuring as used when recording the centralized power generation data. An alternative approach is to simulate the historical photovoltaic power production data by combining solar irradiance data and photovoltaic power production fleet specifications using a photovoltaic simulation model. FIG. 10 is a data flow diagram showing, by way of example, the simulation 100 of photovoltaic power production data. The photovoltaic power production data 107 is determined based on solar irradiance data 100 and plant configuration specifications 106. A time series of solar irradiance or photovoltaic data 101 is first obtained for a set of locations representative of the geographic region within which both the photovoltaic power production resource 23 and the power generation utility 11 are located. Each time series contains solar irradiance observations measured or derived, then electronically recorded at a known sampling rate at fixed time intervals, such as at one-hour intervals, over successive observational time periods. The solar irradiance observations can include solar irradiance measured by a representative set of ground-based weather stations 102, existing photovoltaic systems 103, satellite observations 104, or some combination thereof. Solar irradiance data can be obtained from ground-based measurements, satellite imagery, numerical weather prediction models, as well as through various reliable third party sources, such as the SolarAnywhere data grid web interface and the photovoltaicSimulator photovoltaic system modeling service, available in the SolarAnywhere Toolkit, that uses hourly resource data and user-defined physical system attributes to simulate configuration-specific photovoltaic system output, both available online (http://www.SolarAnywhere.com) through Web-based services operated by Clean Power Research, L.L.C., Napa, Calif. Other sources of the solar irradiance data are possible, including numeric weather prediction models.

Next, the solar irradiance data in the time series is converted over each of the time periods into a set of global horizontal irradiance clear sky indexes, which are calculated relative to clear sky global horizontal irradiance based on the type of solar irradiance data, such as described in commonly-assigned U.S. patent application, entitled "Computer-Implemented Method for Tuning Photovoltaic Power Generation Plant Forecasting," Ser. No. 13/677,175, filed Nov. 14, 2012, pending, the disclosure of which is incorporated by reference. The set of clearness indexes are interpreted into irradiance and power statistics 35 that include high-speed time series plant performance data.

The photovoltaic plant configuration 106 includes power generation and location information, including direct current ("DC") plant and photovoltaic panel ratings; number of power inverters; latitude, longitude and elevation; sampling and recording rates; sensor type, orientation, and number; voltage at point of delivery; tracking mode (fixed, single-axis tracking, dual-axis tracking), azimuth angle, tilt angle, row-to-row spacing, tracking rotation limit, and shading or other physical obstructions. The photovoltaic plant configuration 36 can also be inferred, which can be used to correct, replace or, if configuration data is unavailable, stand-in for the plant's specifications, such as described in commonly-assigned U.S. patent application, entitled "Computer-Implemented System and Method for Inferring Operational Specifications of a Photovoltaic Power Generation System," Ser. No. 13/784, 560, filed Mar. 4, 2013, pending, the disclosure of which is incorporated by reference. Other types of information can also be included as part of the photovoltaic plant configuration.

The resultant high-speed time series plant performance data and photovoltaic plant configuration specifications can be combined to estimate the photovoltaic power production data 107, including photovoltaic fleet power output and variability, such as described in commonly-assigned U.S. Pat. Nos. 8,165,811; 8,165,812; 8,165,813, all issued to Hoff on Apr. 24, 2012; U.S. Pat. Nos. 8,326,535; 8,326,536, issued to Hoff on Dec. 4, 2012; and U.S. Pat. No. 8,335,649, issued to Hoff on Dec. 18, 2012, the disclosures of which are incorporated by reference, for use by power grid planners, operators and other interested parties.

Time series data for the centralized power generation, transmission, and distribution systems are forecast using results derived in terms of centralized power generation. The results apply equally to the load that needs to be supplied at the centralized power generation, transmission, and distribution systems and thus is reflective of the capacities of these systems.

By way of background, utilities and others need to forecast the impact of distributed photovoltaic power production on the utility 11. Suppose that a utility 11 wants to assess this impact over some time period, say one year, by examining hourly data. The utility 11 might take an initial approach by obtaining a time series of centralized power generation data for every hour of a one-year period, for instance, $G_1$, $G_2$, ..., $G_{8,760}$, and a time series of distributed photovoltaic power production data for every hour of a one-year period, for instance, $g_1$, $g_2$, ..., $g_{8,760}$, and calculate the new required centralized power generation as the difference between the two time series, that is, by determining $G_h - g_h$ for all hours h.

There are several limitations with this approach:
1) The distributed photovoltaic power production data needs to be time- and location-correlated with the centralized power generation data. In the case of solar, simply matching historical centralized power generation data with distributed photovoltaic power production data based on typical meteorological year data, particularly data that does not have a fixed time stamp, may not accurately reflect a true matching of corresponding solar and power generation data.
2) Loss savings need to be included. Distributed photovoltaic power production produces power at the place of consumption and does not need to be transmitted from afar and distributed, thus reducing the losses associated with centralized power generation.
3) The loss savings analysis needs to be performed on a marginal, and not on an average, basis since losses are proportional to the square of the current.
4) Growth of customer demand for power over time needs to be incorporated into the analysis.

As discussed supra with reference to FIG. 3, there is a difference between centralized power generation (G) and customer demand (D) that occurs due to system losses and on-site, that is, distributed photovoltaic power production (g). When these three factors are taken into account, forecasted customer demand $D_h^t$ for year t and hour h can be expressed as follows:

$$D_h^t = G_h^t + g_h^t - L_h^t \qquad (1)$$

where $G_h^t$, represents centralized power generation for year t and hour h; $g_h^t$ represents distributed photovoltaic power production for year t and hour h; and $L_h^t$ represents losses associated with the centralized power generation for year t and hour h; t starts at year 0, the initial period; and h is an hour within year t, such that $1 \leq h \leq 8760$. Equation (1) suggests that forecasting future demand is a difficult process because the three variables, future centralized power generation, future distributed photovoltaic power production, and future losses are unknowns that have not yet been observed and which each need to be accurately predicted.

Forecasting customer demand for power can be simplified by making three key assumptions:
1) Future demand grows proportionally to current demand for any time of the year.
2) Average losses are proportional to centralized power generation.
3) Future distributed photovoltaic power production output grows proportionally to current distributed photovoltaic power production output for any time of the year.

The implications of these three assumptions will now be discussed.

The first assumption states that future demand for power grows proportionally to current demand for any time of the year. A utility 11 would ordinarily make this assumption, even in the absence of distributed photovoltaic power production, as demand for power has historically tended to increase, and not decrease, in a service area. This assumption also means that a representative set of projected time series customer demand data can be projected by assuming that demand $D_h^t$ at a given hour h in year t can be forecast using the follow mathematical relationship:

$$D_h^t = e^{rt} D_h^0 \qquad (2)$$

where e is an exponent; r is the demand growth rate; and $D_h^0$ is the current demand in hour h during the initial year 0.

The second assumption states that losses are proportional to centralized power generation. Ohm's law requires that electrical losses be proportional to the square of the generation, given constant voltage. Here, the second assumption implies that the proportionality constant does not change through the year. Losses $L_h^t$ at hour h in year t can be calculated as follows.

$$L_h^t = \alpha(G_h^t)^2 \tag{3}$$

where $\alpha$ is a proportionality constant. Equation (3) can be rearranged by dividing by the forecasted centralized power generation $G_h^t$ to obtain average losses $\eta_h^t$ as a percentage at hour h in year t:

$$\eta_h^t = \frac{L_h^t}{G_h^t} = \alpha G_h^t \tag{4}$$

While not required to simplify the analysis, average losses are assumed to remain constant from year to year for any given hour. This assumption is made to be conservative in estimating average losses and not gain value in loss savings simply because demand is growing. The assumption postulates that capacity additions will occur in response to demand growth to control losses on the utility 11, that is, the utility 11 will make capital investments, such that the losses remain proportional to demand growth. The result is that the year superscript on average losses $\eta_h^t$ can be dropped, so that:

$$\eta_h = \alpha G_h^t \tag{5}$$

Rearranging Equation (5):

$$\alpha = \frac{\eta_h}{G_h^t} \tag{6}$$

In the absence of any distributed photovoltaic power production, centralized power generation would grow at the same rate as demand. Thus, by assuming that $G_h^t = e^{rt} G_h^0$ and substituting into Equation (6):

$$\alpha = \frac{\eta_h}{e^{rt} G_h^0} \tag{7}$$

To calculate the proportionality constant $\alpha$, any hour of the current year can be selected since $\alpha$ is the same for all hours of the year and does not change during the current year. Thus, select some specific hour in the current year and change the h subscript to *. Thus, $\eta_*$ corresponds to the average losses at a generation level of $G_*$ and substituting into Equation (7):

$$\alpha = \frac{\eta_*}{e^{rt} G_*^0} \tag{8}$$

Substitute $\alpha$ into Equation (3) to forecast the loss savings for any hour h of any year t:

$$L_h^t = \left(\frac{\eta_*}{e^{rt} G_*^0}\right)(G_h^t)^2 \tag{9}$$

For comparison purposes, average losses $AL_h^t$ for any hour h of year t are obtained by dividing by $G_f^t$:

$$AL_h^t = \frac{L_h^t}{G_h^t} = \left(\frac{\eta_*}{e^{rt} G_*^0}\right) G_h^t \tag{10}$$

The previous analysis assumed that average losses only include load-related losses. Utilities, however, may report average losses that include both load and no-load losses. To incorporate both types of losses into the analysis, utility-reported data must be translated by adding a no-load loss constant $L_{No\ Load}$ to the right-hand side of Equation (3) for the current year 0 and equating the result to utility-reported average losses:

$$\alpha(G_h^0)^2 + L_{No\ Load} = AL_h G_h^0 \tag{11}$$

Repeat the translation for two distinct reported loss conditions (at hour 1 and hour 2) and express the result as a system of equations:

$$\begin{bmatrix} (G_{h_1}^0)^2 & 1 \\ (G_{h_2}^0)^2 & 1 \end{bmatrix} \begin{bmatrix} \alpha \\ L_{No\ Load} \end{bmatrix} = \begin{bmatrix} AL_{h_1} & G_{h_1}^0 \\ AL_{h_2} & G_{h_2}^0 \end{bmatrix} \tag{12}$$

Multiply both sides of Equation (12) by the inverse of the matrix:

$$\begin{bmatrix} (G_{h_1}^0)^2 & 1 \\ (G_{h_2}^0)^2 & 1 \end{bmatrix}^{-1} \begin{bmatrix} (G_{h_1}^0)^2 & 1 \\ (G_{h_2}^0)^2 & 1 \end{bmatrix} \begin{bmatrix} \alpha \\ L_{No\ Load} \end{bmatrix} = \tag{13}$$

$$\begin{bmatrix} (G_{h_1}^0)^2 & 1 \\ (G_{h_2}^0)^2 & 1 \end{bmatrix}^{-1} \begin{bmatrix} AL_{h_1} & G_{h_1}^0 \\ AL_{h_2} & G_{h_2}^0 \end{bmatrix}$$

And simplify:

$$\begin{bmatrix} \alpha \\ L_{No\ Load} \end{bmatrix} = \left(\frac{1}{(G_{h_1}^0)^2 - (G_{h_2}^0)^2}\right) \begin{bmatrix} 1 & -1 \\ -(G_{h_2}^0)^2 & (G_{h_1}^0)^2 \end{bmatrix} \begin{bmatrix} AL_{h_1} & G_{h_1}^0 \\ AL_{h_2} & G_{h_2}^0 \end{bmatrix} \tag{14}$$

The solution to Equation (14) is:

$$\alpha = \frac{AL_{h_1} G_{h_1}^0 - AL_{h_2} G_{h_2}^0}{(G_{h_1}^0)^2 - (G_{h_2}^0)^2} \tag{15}$$

$$L_{No\ Load} = AL_{h_1} G_{h_1}^0 - \alpha(G_{h_1}^0)^2$$

This solution provides a method to obtain the required parameters when reported average losses include both load and no-load losses.

The third assumption states that future distributed photovoltaic power production output grows proportionally to current distributed photovoltaic power production output. The assumption implies that the distributed photovoltaic power production output profile remains constant and only the distributed photovoltaic power production capacity changes over time. This assumption can be difficult to posit for distributed power production in general, as there is no guarantee that systems will be operated the same way in the future. Distributed photovoltaic power production, however, is a special case relative to other types of distributed energy technologies, as explained supra with reference to Table 2. Photovoltaic power production will produce the same amount of power, regardless of whether demand exists and independent of how price signals may change. Distributed photovoltaic fleet operation does not require on-site demand, and there are no operational decisions to make since the fuel is solar irradiance that is freely available. Thus, the third assumption is satisfied, so long as fleet capacity grows and the fleet composition remains constant, such that the photovoltaic power production output profile, that is, the time series normalized photovoltaic power production output, does not change.

When this assumption is met, the forecasted distributed photovoltaic power production output $\hat{g}_h^t$ (as expressed in MWh) can be normalized relative to forecasted capacity (MW) by dividing generation by fleet capacity:

$$\hat{g}_h^t = \frac{g_h^t}{C^t} \tag{16}$$

Rearranging Equation (16), forecasted distributed photovoltaic power production output equals the capacity of the distributed photovoltaic power production fleet times the fleet's normalized generation:

$$g_h^t = C^t \hat{g}_h^t \tag{17}$$

The assumption is that the composition of the distributed photovoltaic power production fleet is unchanging in terms of configuration and only the size changes over time. As a result, normalized generation is the same for all years:

$$\hat{g}_h^0 = \hat{g}_h^1 = \ldots = \hat{g}_h^T \tag{18}$$

Any year t can be selected to determine the forecasted profile of the distributed photovoltaic power production. Selecting the current year 0:

$$g_h^t = C^t \hat{g}_h^0 \tag{19}$$

The results from these assumptions can now be combined. Substitute Equations (9) and (19) into Equation (1):

$$D_h^t = G_h^t + C^t \hat{g}_h^0 - \left(\frac{\eta_*}{e^{rt} G_*^0}\right) G_h^{t2} \tag{20}$$

All terms on the right-hand side of Equation (20) are known for the current year 0. Thus, demand in the current year 0 equals:

$$D_h^0 = G_h^0 + C^0 \hat{g}_h^0 - \left(\frac{\eta_*}{e^{rt} G_*^0}\right) G_h^{02} \tag{21}$$

Substitute Equation (21) into Equation (2) to estimate future demand:

$$D_h^t = e^{rt}\left[G_h^0 + C^0 \hat{g}_h^0 - \left(\frac{\eta_*}{e^{rt} G_*^0}\right) G_h^{02}\right] \tag{22}$$

Set Equation (22) equal to Equation (20) since both equations equal future demand at the same time:

$$e^{rt}\left[G_h^0 + C^0 \hat{g}_h^0 - \left(\frac{\eta_*}{e^{rt} G_*^0}\right) G_h^{02}\right] = G_h^t + C^t \hat{g}_h^0 - \left(\frac{\eta_*}{e^{rt} G_*^0}\right) G_h^{t2} \tag{23}$$

Centralized power generation $G_h^0$ in the current year 0 can be expressed relative to $G_*^0$ to yield normalized centralized power generation $\hat{G}_h^0$:

$$\hat{G}_h^0 = \frac{G_h^0}{G_*^0} \tag{24}$$

Rearrange Equation (24):

$$G_h^0 = G_*^0 \hat{G}_h^0 \tag{25}$$

Substitute Equation (25) into Equation (23):

$$e^{rt}\left[G_*^0 \hat{G}_h^0 + C^0 \hat{g}_h^0 - \left(\frac{\eta_*}{e^{rt} G_*^0}\right)(G_*^0 \hat{G}_h^0)^2\right] = G_h^t + C^t \hat{g}_h^0 - \left(\frac{\eta_*}{e^{rt} G_*^0}\right) G_h^{t2} \tag{26}$$

Rearrange:

$$\left(\frac{\eta_*}{e^{rt} G_*^0}\right) G_h^{t2} - G_h^t - G_*^0\left[\eta_*(\hat{G}_h^0)^2 - e^{rt}\hat{G}_h^0 + \left(\frac{C^t - C^0 e^{rt}}{G_*^0}\right)\hat{g}_h^0\right] = 0 \tag{27}$$

When $\eta_* = 0$, Equation (27) reduces to:

$$G_h^t = G_*^0\left[e^{rt}\hat{G}_h^0 - \left(\frac{C^t - C^0 e^{rt}}{G_*^0}\right)\hat{g}_h^0\right] \tag{28}$$

When $\eta_* > 0$, use the quadratic formula to solve for future generation and retain the solution with the negative sign in front of the square root:

$$G_h^t = \left(\frac{G_*^0 e^{rt}}{2\eta_*}\right)\left[1 - \sqrt{1 + 4\eta_*\left[\frac{\eta_*}{e^{rt}}(\hat{G}_h^0)^2 - \hat{G}_h^0 + R\hat{g}_h^0\right]}\right] \tag{29}$$

where:

$$R = \left(\frac{C^0}{G_*^0}\right)\left(\frac{C^t}{C^0}e^{-rt} - 1\right) \tag{30}$$

A special case of Equation (30) occurs when there is no growth in distributed photovoltaic power production fleet capacity. In this special case, fleet capacity remains unchanged from the current year 0, such that $C^t = C^0$ and:

$$R^{NoNewPV} = \left(\frac{C^0}{G_*^0}\right)(e^{-rt} - 1) \tag{31}$$

As well, centralized power generation with centralized photovoltaic power production $G_h^{t,w/Central\ PV}$ can be calculated by subtracting centralized power generation with distributed photovoltaic power production from centralized power generation with no additional distributed photovoltaic power production $G_h^{t,w/o\ PV}$:

$$G_h^{t,w/Central\ PV} = G_h^{t,w/o\ PV} - \left(\frac{C^t}{C^0}\right)\hat{g}_h \qquad (32)$$

To evaluate the technical component of the VOS analysis, three centralized power generation scenarios need to be predicted, centralized power generation with distributed photovoltaic power production, centralized power generation with no additional distributed photovoltaic power production, and centralized power generation with centralized photovoltaic power production, which are provided as inputs to load matching. The scenario for centralized power generation with centralized photovoltaic power production corresponds to the situation when there is additional power production from a distributed photovoltaic power production fleet, but no change in power generation losses, as the photovoltaic power production fleet is co-located with the centralized power generation utility. The scenario for centralized power generation with distributed photovoltaic power production corresponds to the situation when there is both additional power production from a photovoltaic power production fleet and a reduction in generation losses, as the photovoltaic power production fleet is co-located with customers and therefore suffers no losses through transmission and distribution and related factors.

These scenarios can be determined by first estimating customer demand by applying the simple-yet-not-simplistic approach, discussed supra. FIG. 11 is a flow diagram showing a routine 110 for estimating customer demand over forecast periods for use in the method 60 of FIG. 3. To estimate future demand, the following forecasts of centralized power generation must be made:

1) Centralized power generation with no additional distributed photovoltaic power production.
2) Centralized power generation with additional photovoltaic power production that is centrally located (co-located) with the centralized power generation utility, such that centralized power generation losses are unaffected by the location of the additional photovoltaic power production resource, that is, there are no loss savings.
3) Centralized power generation with additional photovoltaic power production that is distributed, such that centralized power generation losses are reduced due to the co-location of the photovoltaic power production resource with customers.

Future centralized power generation at any time through a forecast period can be estimated based on a few critical inputs that take into account current and projected distributed photovoltaic power production fleet capacity, the number of years over which to install the fleet, and the growth rate of customer demand. The following data is required:

1) Time series centralized power generation data (expressed in MWh) for the current year, or other long term period of time, broken down on an hourly or other regularly-spaced interval basis, for instance, 8,760 hourly data points for an analysis that is performed on an hourly basis.
2) Time series distributed photovoltaic power production data (expressed in MWh) for the current year, either actually measured or simulated data. The data must be time- and location-correlated to the time series centralized power generation data. Typical meteorological year data generally will not suffice.
3) Average losses (expressed as a percentage of centralized power generation) for a particular centralized power generation condition (expressed in MW) in the current year.
4) Current distributed photovoltaic power production fleet capacity (expressed in MW).
5) Future distributed photovoltaic power production fleet capacity (expressed in MW).
6) Demand growth (expressed as a percentage per year).
7) Number of years to install future distributed photovoltaic power production resource capacity.

First, a time series of readings of centralized power generation data and a time series of readings of distributed photovoltaic power production data are equated as reflective of customer demand during the current (initial) year (step 111). Centralized power generation with no additional distributed photovoltaic power production is forecast (step 112) as a special case photovoltaic power production fleet capacity remains unchanged from the initial year, per Equations (29) and (31). Demand is then predicted for a plurality of successive forecast periods, which will typically cover a number years, by applying Equation (1) and the three key assumptions (steps 113-121), as follows.

For each forecast period (step 113), distributed photovoltaic power production is proportionately increased over the prior forecast period (step 114), per the third key assumption. Distributed photovoltaic power production is then forecast for each regularly-spaced interval, typically on an hourly basis throughout the forecast period (step 115), per Equation (17). The losses associated with centralized power generation are also proportionately increased over the prior forecast period (step 116), per the second key assumption. The losses are then forecast for each regularly-spaced interval (step 117), per Equation (9). Customer demand is proportionately increased over the prior forecast period (step 118), per the first key assumption. The centralized power generation with distributed photovoltaic power production is forecast to meet the proportionately increased customer demand for each regularly-spaced interval (step 119). The forecasted centralized power generation with distributed photovoltaic power production equals the proportionately increased customer demand less the forecasted distributed photovoltaic power production plus the forecasted losses, per Equations (29) and (30).

Centralized power generation with centralized photovoltaic power production is forecast by subtracting the forecasted centralized power generation with distributed photovoltaic power production from the forecasted centralized power generation with no additional distributed photovoltaic power production (step 120), per Equation (32). Forecasting is then repeated for each successive forecast period (step 121).

Time series data for distributed photovoltaic power production, including loss savings, is estimated (step 122). Hourly distributed photovoltaic power production $E_h^{t,Distributed\ PV}$ equals the difference between the forecasted centralized power generation without distributed photovoltaic power production and the forecasted centralized power generation with distributed photovoltaic power production, as calculated supra using Equations (29), (30), and (31).

Distributed photovoltaic power production $E_h^{t,Distributed\,PV}$ is calculated as the difference of the two forecasts to account for loss savings:

$$E_h^{t,Distributed\,PV} = G_h^{t,w/o\,PV} - G_h^{t,w/Distributed\,PV} \quad (33)$$

Annual distributed photovoltaic power production $E^{t,Distributed\,PV}$ equals the sum of the hourly photovoltaic production over all hours of the year:

$$E^{t,Distributed\,PV} = \sum_{h=1}^{8,760} E_h^{t,Distributed\,PV} \quad (34)$$

Hourly centralized photovoltaic power production $E_h^{t,Central\,PV}$ equals the difference between the forecasted centralized power generation with no additional distributed photovoltaic power production and the forecasted centralized power generation with distributed photovoltaic power production, as calculated supra using Equations (29), (31), and (32):

$$E_h^{t,Central\,PV} = G_h^{t,w/o\,PV} - G_h^{t,w/Central\,PV} \quad (35)$$

Annual centralized photovoltaic power production $E^{t,Central\,PV}$ equals the sum of the hourly photovoltaic production over all hours of the year:

$$E^{t,Central\,PV} = \sum_{h=1}^{8,760} E_h^{t,Central\,PV} \quad (36)$$

Referring back to FIG. 3, the forecasted generation time series data can be used to produce technical results (step 77) that include the hourly and annual photovoltaic production time series data, plus Load Match and Loss Savings results, which are presented to the user in a readily-comprehensible format.

Forecasted customer demand is matched to the three predicted centralized generation scenarios. FIG. 12 is a flow diagram showing a routine 130 for performing load balancing for use in the method 60 of FIG. 3. The routine calculates two results. The first result assumes that the photovoltaic power production resource is distributed. Thus, forecasted centralized power generation with distributed photovoltaic power production is load matched to forecasted centralized power generation with no additional distributed photovoltaic power production (step 131). The second result assumes that photovoltaic is centrally located, that is, co-located with the centralized power generation utility. Thus, forecasted centralized power generation with centralized photovoltaic power production is load matched to forecasted centralized power generation with no additional distributed photovoltaic power production (step 132). Each of the load matches generates a single number result that is used in determining loss savings, as further described infra with reference to FIG. 13.

Two load matching approaches can be used, Effective Load Carrying Capability (ELCC) and Peak Load Reduction. The load match is generally calculated using the ELCC method for generation capacity and the Peak Load Reduction method for the transmission and distribution system. The ELCC measures how photovoltaic power production matches the power generation profile using a Loss of Load Probability (LOLP) approach, such as described in, L. Garver, "Effective Load Carrying Capability of Generating Units," IEEE Trans. on Power App. and Sys., Vol. Pas-85, No. 8 (1966); T. Hoff, "Calculating Photovoltaics' Value: A Utility Perspective," IEEE Trans. on Energy Conv., Vol. 3, pp. 491-495 (1988); R. Perez et al., "Assessing the Load Matching Capability of Photovoltaics for U.S. Utilities Based Upon Satellite-Derived Insolation Data," Conf. Rec. of 23d IEEE Photovoltaic Specialists Conf., pp. 1146-1149 (1993); and T. Hoff et al., *Photovoltaic Capacity Valuation Methods*, Solar Electric Power Assoc. Report #02-08 (2008), the disclosure of which are incorporated by reference. LOLP is defined as the rating of a perfectly operating base load plant that results in the same loss of load probability as the photovoltaic power production resource. The ELCC is expressed as a percentage of the photovoltaic power production fleet rating. For example, a 1000 MW photovoltaic power production fleet with a 50 percent ELCC would provide the same generation portfolio reliability as a 500 MW base load unit.

The ELCC is a statistical measure of effective capacity. The ELCC of a generating unit in a utility grid is defined as the load increase (MW) that the system can carry while maintaining the designated reliability criteria, for instance, constant loss of load probability. The ELCC is obtained by analyzing a statistically significant time series of the unit's power generation output and of the utility's power requirements. The ELCC is calculated as follows:

$$LOLP^{t,w/o\,PV} = \sum_{h=1}^{8,760} \exp\left[-\frac{(G_{Peak}^{t,w/o\,PV} - G_h^{t,w/o\,PV})}{m}\right] \quad (37)$$

where m is the Garver m characteristic, which is approximately equal to 5 percent of the peak generation. In addition:

$$LOLP^{t,w/PV\&ELCC} = \sum_{h=1}^{8,760} \exp\left[-\frac{(G_{Peak}^{t,w/o\,PV} - (G_h^{t,w/PV} + ELCC^t))}{m}\right] \quad (38)$$

Set Equations (37) and (38) equal to each other and solve:

$$ELCC^t = m\ln\left\{\frac{\sum_{h=1}^{8,760} \exp\left[-\frac{(G_{Peak}^{t,w/o\,PV} - G_h^{t,w/o\,PV})}{m}\right]}{\sum_{h=1}^{8,760} \exp\left[-\frac{(G_{Peak}^{t,w/o\,PV} - G_h^{w/PV})}{m}\right]}\right\} \quad (39)$$

The ELCC can be calculated for both centralized power generation with distributed photovoltaic power production and centralized power generation with centralized photovoltaic power production. The ELCC for centralized power generation with distributed photovoltaic power production $ELCC^{t,Distributed\,PV}$ is:

$$ELCC^{t,Distributed\,PV} = m\ln\left\{\frac{\sum_{h=1}^{8,760} \exp\left[-\frac{(G_{Peak}^{t,w/o\,PV} - G_h^{t,w/o\,PV})}{m}\right]}{\sum_{h=1}^{8,760} \exp\left[-\frac{(G_{Peak}^{t,w/o\,PV} - G_h^{w/Distributed\,PV})}{m}\right]}\right\} \quad (40)$$

The ELCC for centralized power generation with distributed photovoltaic power production $ELCC^{t,Central\,PV}$ is:

$$ELCC^{t,Central\ PV} = m\ln\left\{\frac{\sum_{h=1}^{8,760}\exp\left[-\frac{(G_{Peak}^{t,w/o\ PV}-G_{h}^{t,w/o\ PV})}{m}\right]}{\sum_{h=1}^{8,760}\exp\left[-\frac{(G_{Peak}^{t,w/o\ PV}-G_{h}^{w/Central\ PV})}{m}\right]}\right\} \quad (41)$$

The Peak Load Method determines the ability of photovoltaic power production resource to directly reduce the load at the peak time of the year. Peak load calculated by determining peak generation without photovoltaic power production, calculating hourly generation with photovoltaic power production, as described supra, and determining the new peak load. Note that the day and time of the new (reduced) peak may be different than the original peak. The difference between these two numbers is the peak load reduction. The Peak Load Method provides a stringent test represents a "worst case" analysis. For example, suppose that the utility's annual peak was projected to be 10,000 MW at 6:00 pm on Aug. 15, 2014 and that the addition of 1,000 MW of distributed photovoltaic power production changes the peak to 9,500 MW at 7:00 pm on Jul. 14, 2014. The resources would have an effective reduction of 500 MW, or 50 percent of rated capacity.

The Peak Load Reduction can be employed to evaluate the match (M) between the photovoltaic system output and generation (or load). The approach determines the peak load reduction $PLR^t$ before, and after, photovoltaic power production is added, including the effect of loss savings, by examining the load for every hour of the year t. The difference between before versus after may be considered the effective peak load reduction provided by the addition of photovoltaic power production, which is a conservative approach to evaluating load match:

$$PLR^t = \max\{G_1^{t,w/o\ PV}, G_2^{t,w/o\ PV}, \ldots, G_{8760}^{t,w/o\ PV}\} - \max\{G_1^{w/\ PV}, G_2^{w/\ PV}, \ldots, G_{8760}^{w/\ PV}\} \quad (42)$$

The Peak Load Reduction can be calculated for both centralized power generation with distributed photovoltaic power production and centralized power generation with centralized photovoltaic power production. The Peak Load Reduction for centralized power generation with distributed photovoltaic power production $PLR^{t,Distributed\ PV}$ is:

$$PLR^{t,Distributed\ PV} = \max\{G_1^{t,w/o\ PV}, G_2^{t,w/o\ PV}, \ldots, G_{8760}^{t,w/o\ PV}\} - \max\{G_1^{w/\ Distributed\ PV}, G_2^{w/\ Distributed\ PV}, \ldots, G_{8760}^{w/\ Distributed\ PV}\} \quad (43)$$

The Peak Load Reduction for centralized power generation with centralized photovoltaic power production $PLR^{t,central\ PV}$ is:

$$PLR^{t,Central\ PV} = \max\{G_1^{t,w/o\ PV}, G_2^{t,w/o\ PV}, \ldots, G_{8760}^{t,w/o\ PV}\} - \max\{G_1^{w/\ Central\ PV}, G_2^{w/\ Central\ PV}, \ldots, G_{8760}^{w/\ Central\ PV}\} \quad (44)$$

Other approaches can be employed to evaluate the match between the photovoltaic system output and generation (or load), including examining the average peak load reduction over some defined peak load time period or defined peak load conditions.

The last step in the technical component of the VOS analysis is quantifying loss savings. Loss savings are calculated by comparing the difference between the results for the load matching for centralized power generation with distributed photovoltaic power production and centralized power generation with centralized photovoltaic power production. For example, if centralized power generation with distributed photovoltaic power production has a 60-percent ELCC and centralized power generation with centralized photovoltaic power production has a 50-percent ELCC, loss savings will equal 20 percent, that is, $$\frac{60\%}{50\%} - 100\% = 20\%.$$

The ELCC for centralized power generation with distributed photovoltaic power production is always greater than or equal to the ELCC for centralized power generation with centralized photovoltaic power production.

Loss savings are typically presented as part of the Load Match calculation using the ELCC and Peak Load Reduction methods. FIG. 13 is a flow diagram showing a routine 140 for determining loss savings for use in the method 60 of FIG. 3. The routine evaluates the function of the load match of centralized power generation with distributed photovoltaic power production in light of centralized power generation with no additional distributed photovoltaic power production (step 141) and the function of the load match of centralized power generation with centralized photovoltaic power production customer demand load in light of centralized power generation with no additional distributed photovoltaic power production (step 142).

Loss Savings for the energy generation Loss Savings$^t$ in year t is:

$$\text{Loss Savings}^t = \frac{E^{t,Distributed\ PV}}{E^{t,Central\ PV}} - 1 \quad (45)$$

where $E^{t,Distributed\ PV}$ and $E^{t,Central\ PV}$ are calculated using Equations (34) and (36), discussed supra.

Avoided generation capacity cost is based on the ELCC method. Loss Savings for the avoided generation capacity cost Loss Savings$^t$ for year t is:

$$\text{Loss Savings}^t = \frac{ELCC^{t,Distributed\ PV}}{ELCC^{t,Central\ PV}} - 1 \quad (46)$$

Avoided transmission and distribution capacity cost is based on the Peak Load Reduction method. Loss Savings for avoided transmission and distribution capacity cost Loss Savings$^t$ for year t is:

$$\text{Loss Savings}^t = \frac{PLR^{t,Distributed\ PV}}{PLR^{t,Central\ PV}} - 1 \quad (47)$$

In a further embodiment, Loss Savings can be identified separately by performing the Load Match calculation for centralized power generation with distributed photovoltaic power production customer to account for loss savings and for centralized power generation with centralized photovoltaic power

TABLE 3

| | Current Conditions (MW) | | | | | Projected Conditions (MW) | | | | |
|---|---|---|---|---|---|---|---|---|---|---|
| | Gen. Now | | | | Normalized | | Gen. In 10 years w/1000 PV = | | | |
| | w/ 22 MW of PV (Measured) | PV (Measured or SA) | Losses = (aG^2) | Demand = G + g − L | Gen. = G/ 6394 | PV Fleet = g/22 | MW of PV = Formula | Norm PV* 100 | Losses = (aGt^2) | Demand = Gt + gt − L | Validation Demand 1.35 * G |
| Aug. 24, 2011 12:00 | 5288 | 20.4 | 213 | 5095 | 83% | 93% | 6246 | 929 | 297 | 6878 | 6878 |
| Aug. 24, 2011 13:00 | 5620 | 20.5 | 241 | 5400 | 88% | 93% | 6701 | 930 | 342 | 7289 | 7289 |
| Aug. 24, 2011 14:00 | 5906 | 18.9 | 266 | 5659 | 92% | 86% | 7172 | 859 | 392 | 7639 | 7639 |
| Aug. 24, 2011 15:00 | 6172 | 16.3 | 290 | 5838 | 97% | 74% | 7670 | 740 | 448 | 7961 | 7961 |
| Aug. 24, 2011 16:00 | 6323 | 12.4 | 305 | 6031 | 99% | 57% | 8072 | 565 | 497 | 8141 | 8141 | production customer to eliminate the effect of loss savings, then comparing the two results.

Figure 14:
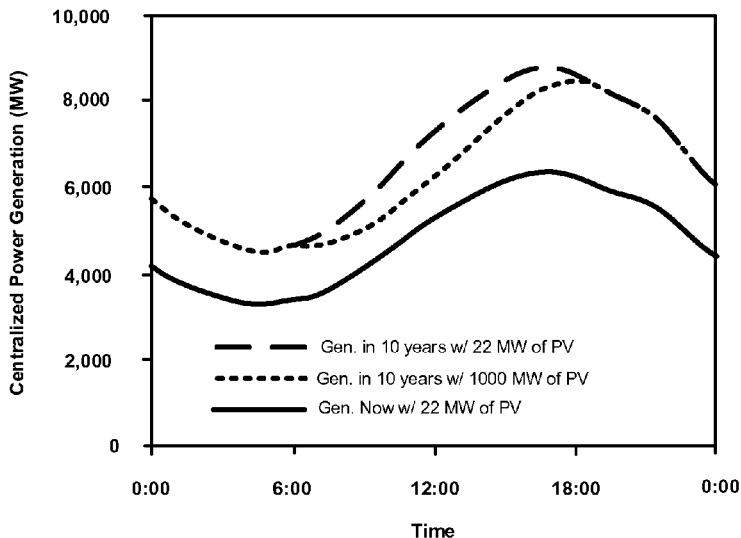
FIG. 14 is a graph showing, by way of example, current and forecasted centralized power generation.
Figure 15:
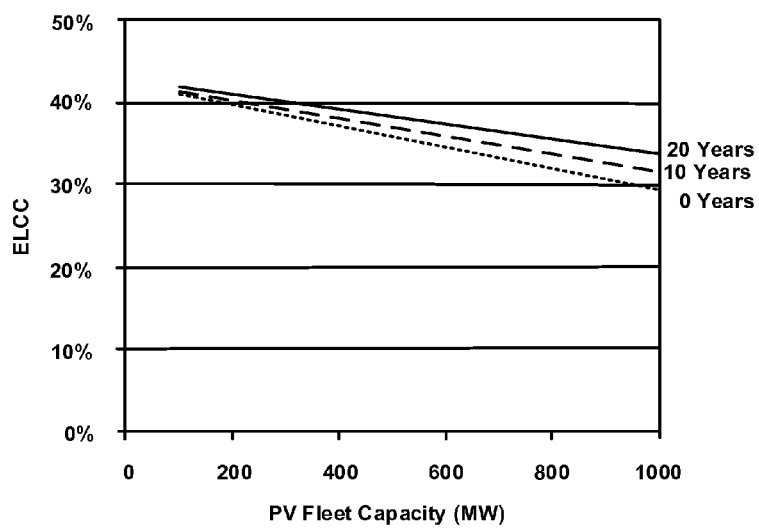
FIG. 15 is a graph showing, by way of example, Effective Load Carrying Capability (ELCC) as a function of distributed photovoltaic power production capacity and number of years required to achieve the capacity.

Table 3 provides data obtained for a sample utility that can help illustrate applying the foregoing demand forecasting methods and equations, as discussed supra. The "Current Conditions" column provides the measured data. Centralized power generation and distributed photovoltaic power production for the current (initial) year were normalized, as described supra, then the forecasted centralized power generation was calculated. FIG. 14 is a graph showing, by way of example, current and forecasted centralized power generation. The x-axis represents time of day. The y-axis represents centralized power generation in megawatts ("MW"). FIG. 15 is a graph showing, by way of example, ELCC as a function of distributed photovoltaic power production capacity and number of years required to achieve the capacity. The x-axis represents distributed photovoltaic fleet power production capacity in megawatts ("MW"). They-axis represents ELCC. The results show that the ELCC increases significantly when load growth is considered for high photovoltaic penetrations.

Referring back to FIG. 3, the economic component of the VOS analysis approach (steps 70-76) assesses economic factors applicable to an "Ideal Resource." Numerical examples are provided for each value component.

Distributed photovoltaic power production offsets centralized power generation cost. Each kilowatt hour ("kWh") generated through distributed photovoltaic power production results in one less unit of energy that the utility needs to purchase or generate. In addition, distributed photovoltaic power production reduces losses in the transmission and distribution systems, such that the cost of the wholesale generation that would have been lost is also a contributor to value. The value is based on the cost of natural gas fuel that would otherwise have to be purchased to operate a combined-cycle combustion gas turbine (CCGT) plant and to meet electric loads that compensate for transmission and distribution losses.

Avoided Fuel Cost (AFC) represents the additional cost of the fuel that would have been consumed by CCGT in the absence of distributed photovoltaic power production. This value is calculated (step 70) as the price of natural gas in year t times the CCGT's heat rate times the quantity of the energy produced by the distributed photovoltaic power production system, plus the energy saved due to reduced losses, discounted to the present:

$$AFC = \sum_{t=1}^{T} \frac{E^t H^t P_{NG}^t}{(1+r)^t} \quad (48)$$

where t is the year, $P_{NG}^t$ is the price of natural gas in year t ($/BTU), $H^t$ is the heat rate of the CCGT (Btu/kWh), $E^t$ is the annual energy produced by the photovoltaic system in year t (expressed in kWh per year, including loss savings), and r is the nominal discount rate.

The heat rate $H^t$ at time t equals the initial heat rate divided by a degradation factor, given that the heat rate of the CCGT is degrading at a constant rate over time ($d_{CCGT}$). The degradation factor determines how the efficiency of the CCGT plant is changing over time:

$$H^t = \frac{H^1}{(1-d_{CCGT})^{t-1}} \quad (49)$$

Distributed photovoltaic power production at time t equals the distributed photovoltaic power production in the initial year, adjusting for loss savings times a degradation factor ($d_{PV}$):

TABLE 4

| Parameter | | Default Value |
|---|---|---|
| $H^1$ | CCGT heat rate | 6,824 BTU/kWh (50% efficient) |
| $P_{NG}^t$ | Set of annual natural gas prices over T years | Average monthly NYMEX natural gas futures prices for years available and then escalate for additional years at some rate as implied by the NYMEX data. Examples assume prices are $4.00 per MMBtu escalating at 5% per year |
| r | Nominal discount rate | 8% |
| $E^1$ | PV energy production in 1st year, including loss savings | Calculated based on the difference between generation with and without PV system |
| T | PV system life | 30 years |

$$E^t = E^1(1-d_{PV})^{t-1} \quad (50)$$

Substituting Equations (49) and (50) into Equation (48) results in an Avoided Fuel Cost of:

$$AFC = E^1 H^1 \sum_{t=1}^{T} \left[\frac{P_{NG}^t}{(1+r)^t}\right] \left(\frac{1-d_{PV}}{1-d_{CCGT}}\right)^{t-1} \quad (51)$$

Assuming that the CCGT and photovoltaic power production system are degrading at the same rate over time, the degradation terms cancel and the AFC equals the heat rate times the quantity of the photovoltaic energy production plus the loss savings in the first year times a term that discounts natural gas prices over time:

$$AFC = E^1 H^1 \sum_{t=1}^{T} \frac{P_{NG}^t}{(1+r)^t} \quad (52)$$

Table 4 lists the parameters and default values required to calculate the Avoided Fuel Cost as specified in Equation (51). Table 5 illustrates, by way of example, how to calculate the present value of avoided fuel cost.

A similar approach can be taken to calculate the avoided operations and maintenance cost as for the avoided fuel cost. Avoided operations and maintenance cost (AO&MC) can be quantified as the difference between the operations and maintenance cost for a CCGT and the operations and maintenance cost for a distributed photovoltaic power production system times the amount of energy produced by the distributed photovoltaic power production, discounted. If both sets of operations and maintenance costs are escalating at the same rate over time, and ΔOM represents the difference between the operations and maintenance cost for the CCGT and the operations and maintenance cost for the distributed photovoltaic power production, then the operations and maintenance cost for cost savings is calculated (step 71) as follows $$AO\&MC = E^1 \Delta OM^1 \sum_{t=1}^{T} \frac{(1+e_{OM})^{t-1}}{(1+r)^t} \left(\frac{1-d_{PV}}{1-d_{CCGT}}\right)^{t-1} \quad (53)$$

Table 6 lists the parameters and default values required to calculate the present value avoided operations and maintenance cost as specified in Equation (53).

TABLE 6

| Parameter | | Default Value |
|---|---|---|
| ΔOM[1] | CCGT and PV O&M cost difference | $0.02/kWh |
| $e_{OM}$ | O&M cost escalation rate | 3% |
| r | Normal discount rate | 8% |
| $E^1$ | PV energy production in 1st year, including loss savings | Calculated based on the difference between generation with and without PV system |
| T | PV system life | 30 years |

The total cost of power includes the capital cost of the centralized power generation plant, in addition to the fuel and operations and maintenance costs. These items would be included as the capital cost of displaced generation to the extent that distributed photovoltaic power production displaces the need for centralized power generation capacity. The key to valuing this component is to determine the ELCC of the distributed photovoltaic power production fleet, which can be found by projecting future centralized power generation with and without distributed photovoltaic power production and comparing the results on an hourly (or more frequent) time scale.

Avoided generation capacity cost (AGCC) is calculated (step 72) as the capital cost (expressed in $/MW) of the displaced centralized power generation unit times the ELCC, presented in Equation (39):

$$AGCC = (C_G)(M) \quad (54)$$

Figure 16:
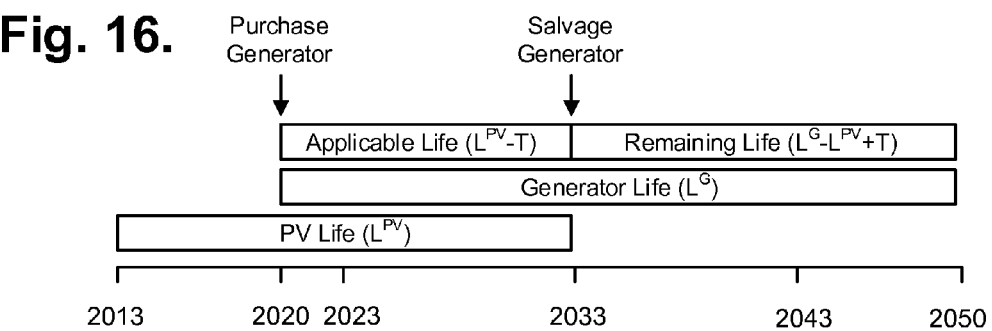
FIG. 16 is a time line showing, by way of example, the service life of a centralized power generation plant.

FIG. 16 is a time line showing, by way of example, the service life of a centralized power generation plant. A distributed photovoltaic power production fleet put into service in 2013 would have a 20-year service life, extending to 2033. A power generator that was purchased in 2020 would have a service life of 30-year service life, extending to 2050. Generation that could be delayed for T years would cost:

$$\text{Delayed Generation Cost} = (C_G)(1+e_G)^T \quad (55)$$

The figure illustrates, by way of example, that the applicable life of a delayed investment equals photovoltaic life minus the number of years of delay $L^{photovoltaic} - T$. A credit needs to be applied for the remaining generator life. Escalate the cost of the delayed generation, per Equation (55), for an additional $L^{photovoltaic} - T$ years to reflect value at a later date, then multiply by the fraction of remaining generation life:

$$AGC = (C_G)(1+e_G)^T (1+e_G)^{L^{PV}-T} \left[\frac{L^G - L^{PV} + T}{L^G}\right] \quad (56)$$

TABLE 5

| Year | PV + Loss Savings (MWh/yr) | CCGT Heat Rate (MMBtu/MWh) | NG Price ($/MMBtu) | Fuel Savings ($/year) | O&M Cost ($/MWh) | O&M Cost Savings ($/year) | Fuel + O&M Savings ($/year) | Energy Value (Present value $) |
|---|---|---|---|---|---|---|---|---|
| 1 | 1,650 | 6.824 | $4.00 | $45,038 | $20.00 | $33,000 | $78,038 | $72,258 |
| 2 | 1,642 | 6.858 | $4.20 | $47,290 | $20.40 | $33,492 | $80,782 | $69,258 |
| 30 | 1,427 | 7.892 | $16.46 | $185,384 | $35.52 | $50,674 | $236,059 | $23,459 |
| Total | | | | | | | | $1,284,879 |

AGCC is then obtained by subtracting the discounted generation cost credit for $L^{photovoltaic}$ years from the discounted delayed generation cost for T years times M to reflect load match:

$$AGCC = (C_G)\left(\frac{1+e_G}{1+d}\right)^T\left[1-\left(\frac{1+e_G}{1+d}\right)^{L^{PV}-T}\left(\frac{L^G-L^{PV}+T}{L^G}\right)\right](M) \quad (57)$$

Table 7 lists the parameters and default values required to calculate the present value AGCC, as specified in Equation (54). By way of example, suppose

TABLE 7

| Parameter | | Default Value |
|---|---|---|
| $C_G$ | Fully loaded capital cost of generation | Assumed to be $1,000,000/MW for cost of CCGT |
| M | Load Match | Based on ELCC method |

TABLE 8

| Parameter | | Default Value |
|---|---|---|
| $C_G$ | Fully loaded capital cost of generation | Assumed to be $1,000,000/MW for cost of CCGT |
| M | Load Match | Based on ELCC method |
| RM | Reserve Margin | Assumed to be 12% | that the ELCC time capacity equals 0.8 MW and the cost of capacity is $1,000,000 per MW. AGCC equals $1,000,000/MW×0.8 MW=$800,000.

Avoided reserve capacity cost (ARCC) is the benefit from added reserve capacity provided to the centralized power generation system by distributed photovoltaic power production. Generally, power utilities must install additional generation that may be called upon if needed due to forced plant outages to satisfy reliability requirements. The reserve capacity is specified by a planning margin percentage above the amount required to meet forecasted peak loads. By reducing the peak loads, distributed photovoltaic power production also reduces the amount of reserve capacity required, while holding the percentage margin constant.

The ARCC is closely related to the AGCC. ARCC is calculated (step 73) as AGCC times the reserve margin:

$$ARCC=(RM)(C_G)(M) \quad (58)$$

Table 8 lists the parameters and default values required to calculate the present value ARCC as specified in Equation (58). By way of example, suppose that the ELCC time capacity equals 0.8 MW and the cost of capacity is $1,000,000 per MW. ARCC equals 0.12×$1,000,000/MW×0.8 MW=$96,000.

Avoided transmission and distribution capacity cost is most affected by the distributed photovoltaic power production system's location. The avoided transmission and distribution capacity cost (AT&DCC) depends on the existence of location-specific projected expansion plan costs to ensure reliability over the coming years as the loads grow. Capacity-constrained areas where loads are expected to reach critical limits present more favorable locations for photovoltaic power production to the extent that distributed photovoltaic power production will relieve the constraints, providing more value to the utility than those areas where capacity is not constrained.

Distributed photovoltaic power production reduces the burden on the distribution system and appears as a "negative load" during the daylight hours from the perspective of the distribution operator. Distributed photovoltaic power production may be considered equivalent to distribution capacity from the perspective of the distribution planner, provided that the distributed photovoltaic power production occurs at the time of the local distribution peak.

Distributed photovoltaic power production capacity located in an area of growing loads allows a utility planner to defer capital investments in distribution equipment, such as substations and lines. The value is determined by the avoided cost of money due to the capital deferral.

The avoided transmission and distribution capacity cost can be quantified in a two-step process (step 74). First, an economic screening of all areas is performed to determine the expansion plan costs and load growth rates for each planning area. Second, a technical load-matching analysis is performed for the most promising locations. The results are then used in the following calculation:

$$\text{Avoided } T\&D \text{ Capacity Cost} = \left(\frac{C_{T\&D}}{L}\right)\left(\frac{r-e_{T\&D}}{1+r}\right)(M) \quad (59)$$

where $C_{T\&D}$ is the fully loaded present value cost of the distribution area expansion plan over the study period ($), L is the annual load growth (MW/yr), r is the nominal discount rate, $e_{T\&D}$ is the escalation rate of transmission and distribution system expenditures, and M is the Load Match (MW) calculated using the Peak Load Reduction Method presented in Equation (42). The Load Match can be calculated over multiple years and the average of M taken.

Table 9 lists the parameters and default values required to calculate the present value AT&DCC, as specified in Equation (59). By way of example, suppose that the load match equals 0.5 MW and the capacity expansion plan cost

TABLE 9

| Parameter | | Default Value |
|---|---|---|
| $C_{T\&D}$ | Present value of T&D upgrade cost over T years | Distribution system specific |
| L | Annual T&D load growth (MW per year) | Distribution system specific |
| $e_{T\&D}$ | T&D system upgrade cost escalation rate | 3% per year |
| r | Nominal discount rate | 8% |
| M | Load match | Based on Peak Load Reduction Method | is $5,000,000, the load is growing 0.3 MW per year, the discount rate is 8 percent and the T&D escalation rate is 3 percent. The AT&DCC equals $385,802, that is, $$\left(\frac{\$5,000,000}{0.3 \text{ MW}}\right)\left(\frac{0.08-0.03}{1+0.08}\right)(0.5 \text{ MW}) = \$385,802.$$

Solar-based power production is insensitive to the volatility of fuel prices, while fossil-based generation is directly tied to fuel prices. Solar power production, therefore, offers a "guarantee" against fuel price volatility. The value of this guarantee can be quantified against fluctuating natural gas prices. The key to calculating the fuel price guarantee value (FPGV) is to effectively convert the fossil-based generation investment from one that has substantial fuel price uncertainty to one that has no fuel price uncertainty. This conversion can be accomplished by entering into a binding commitment to purchase a lifetime supply of fuel to be delivered as needed. The utility could set aside the entire fuel cost obligation up front and invest the obligation in risk-fee securities to be drawn from each year as required to meet the obligation. The approach uses two financial instruments: risk-free, zero-coupon bonds (a zero coupon bond does not make any periodic interest payments) and a set of natural gas futures contracts.

Consider how this arrangement might work. Suppose that the CCGT operator wants to obtain a fixed price contract for a sufficient quantity of natural gas to operate the plant for one month, one year in the future. First, the operator would determine how much natural gas will be needed. If E units of electricity are to be generated and the heat rate of the plant is H, E*H BTUs of natural gas will be needed. Second, if the corresponding futures price of this natural gas is $p^{NG\ Futures}$ (in $ per BTU), then the operator will need $E*H*p^{NG\ Futures}$ dollars to purchase the natural gas one year from now. Third, the operator needs to set the money aside in a risk-free investment, typically a risk-free bond (rate-of-return of $r_{risk-free}$ percent) to guarantee that the money will be available when it is needed one year from now. Therefore, the operator would immediately enter into a futures contract and purchase $E*H*P_{NG\ Futures}/(1+r_{risk-free})$ dollars' worth of risk-free, zero-coupon bonds to guarantee with certainty that the financial commitment (to purchase the fuel at the contract price at the specified time) will be satisfied, such that $[E*H*P_{NG\ Futures}/(1+r_{risk-free})]*(1+r_{risk-free})=E*H*P_{NG\ Futures}$. This same approach can be repeated for all years of the analysis and the results summed to calculate the certain fuel cost:

$$CFC = \sum_{t=1}^{T} \frac{E^t H^t P^t_{NG\ Futures}}{\left(1+r^t_{risk-free}\right)^t} \quad (60)$$

Applying the same technology degradation assumptions as used in the Avoided Fuel Cost section provides:

$$CFC = E^1 H^1 \sum_{t=1}^{T} \frac{P^t_{NG\ Futures}}{\left(1+r^t_{risk-free}\right)^t} \quad (61)$$

The fuel price guarantee value FPGV is calculated (step 75) as the difference between the fuel cost savings, as discussed supra, and the certain fuel cost:

$$FPGV = E_1 H_1 \left[\sum_{t=1}^{T} \frac{P^t_{NG\ Futures}}{\left(1+r^t_{risk-free}\right)^t} - \sum_{t=1}^{T} \frac{P^t_{NG}}{(1+r)^t}\right] \quad (62)$$

The assumed default value for the price of natural gas for the avoided fuel cost section was the natural gas price based on NYMEX futures prices. Thus, Equation (62) can be simplified:

$$FPGV = E_1 H_1 \left\{\sum_{t=1}^{T} \frac{P^t_{NG\ Futures}\left[1-\left(\frac{1+r^t_{risk-free}}{1+r}\right)^t\right]}{\left(1+r^t_{risk-free}\right)^t}\right\} \quad (63)$$

TABLE 10

| Year | PV + Loss Savings (MWh) | CCGT Heat Rate (MMBtu/MWh) | NGFutures Price ($/MMBtu) | Fuel Savings ($/year) | Economic factor | Hedge Value (Present value $) |
|---|---|---|---|---|---|---|
| 1 | 1,650 | 6.824 | $ 4.00 | $45,038 | 0.04 | $1,604 |
| 2 | 1,642 | 6.858 | $ 4.20 | $47,290 | 0.07 | $3,179 |
| ... | | | | | | |
| 30 | 1,427 | 7.892 | $16.46 | $185,384 | 0.21 | 38,734 |
| Total | | | | | | $641,211 |

TABLE 11

| Parameter | | Default Value |
|---|---|---|
| $H^1$ | CCGT heat rate | 6,824 BTU/kWh (50% efficient) |
| $P^t_{NGFutures}$ | Set of annual natural gas prices over T years | Average monthly NYMEX natural gas futures prices for years available and then escalate. Examples assume prices are $4.00 per MMBtu escalating at 5% per year |
| r | Nominal discount rate | 8% per year |
| $r_{risk-free}$ | Risk-free rate | Specified by the yield curve (or combinations of investments to deliver bonds with the desired maturities). [6] Assumed to be a constant 6% for example |
| $E^1$ | Annual PV energy production in 1st year | Determined by PV system configuration and location |
| T | PV system life | 30 years |

Table 10 lists the parameters and default values required to calculate the present value FPGV as specified in Equation (62). Table 11 illustrates, by way of example, how to calculate the FPGV.

The environmental impact of photovoltaic power production is considerably smaller than that of fossil-fuel based power generation since photovoltaic power production is able to displace pollution associated with drilling and mining, and power plant emissions. There are two general approaches to quantifying the avoided environmental cost (AEC) of photovoltaic power production, a regulatory cost-based approach and an environmental and health cost-based approach.

The regulatory cost-based approach values the AEC of photovoltaic power production based on the price of Renewable Energy Credits (RECs) or Solar Renewable Energy Credits (SRECs) that would otherwise have to be purchased to satisfy state Renewable Portfolio Standards (RPS). These costs are a preliminary legislative attempt to quantify external costs and represent actual business costs faced by utilities in certain states.

An environmental and health cost-based approach quantifies the societal costs resulting from fossil fuel-based power generation. Each solar-produced kWh of power displaces an otherwise "dirty" kWh produced by fossil fuel power generation and commensurately mitigates greenhouse gases, SOx/NOx emissions, mining degradations, ground water contamination, toxic releases and wastes, and so forth, that are all present or postponed costs to society. Several exhaustive studies have estimated the environmental and health cost of energy generated by fossil-based generation, such as described by J. Devezeaux, "Environmental Impacts of Electricity Generation," 25$^{th}$ Uranium Inst. Annual Symp., London, UK (2000); and P. Epstein, P., "Full cost accounting for the life cycle of coal," Annals of the NY Academy of Sci. (2011), the disclosures of which are incorporated by reference. The results from environmental and health cost-based approach often vary widely and can be controversial.

The regulatory cost-based approach represents the actual costs that would be incurred by the utility and is readily quantifiable because the data are more readily available. Note that loss savings are not typically included when evaluating the benefit using a regulatory cost-based approach. The avoided environmental cost is calculated (step 76) as the annual photovoltaic output plus times REC price discounted for each year:

$$AEC = \sum_{t=1}^{T} \frac{E^t P_{REC}^t}{(1+r)^t} \quad (64)$$

Note that REC values are typically based on photovoltaic power production output and are not adjusted for loss savings.

TABLE 12

| Parameter | | Default Value |
|---|---|---|
| $P_{REC}$ | REC price | $25/MWh |
| $e_{REC}$ | REC price escalation rate | 3% |
| $d_{PV}$ | PV degradation | 0.5% per year |
| $E^1$ | Annual PC energy production in 1$^{st}$ year | Determined by PV system configuration and location |
| r | Nominal discount rate | 8% per year |

TABLE 13

| Year | PV (MWh/yr) | REC Price ($/MWh) | Environmental Value ($/year) | Environmental Value (Present Value $) |
|---|---|---|---|---|
| 1 | 1,500 | $25.00 | $37,500 | $34,722 |
| 2 | 1,493 | $25.75 | $38,432 | $32,949 |
| ... | | | | |
| 30 | 1,297 | $58.91 | $76,415 | $7,594 |
| Total | | | | $538,846 |

Assume that REC prices ($P_{REC}$) are escalating at a rate of $e_{REC}$ per year after the first year and that distributed photovoltaic power production system output is degrading as specified in Equation (50).

$$AEC = E^t P_{REC}^1 \sum_{t=1}^{T} \frac{[(1+e_{REC})(1-d_{PV})]^{t-1}}{(1+r)^t} \quad (65)$$

Table 12 lists the parameters and default values required to calculate the present value AEC as specified in Equation (65). Table 13 illustrates, by way of example, how to calculate the AEC.

Each value component calculated per the foregoing forecasting methods and equations, as discussed supra, is expressed in Present Value terms (total $). In a further embodiment, Present Value can be converted to Levelized Value ($ per kWh), which is generally the constant value that results in the same present value as the discounted actual projected values.

For each value component, there exists a value, called Levelized Value, that is constant over time ($ per kWh), such that when multiplied by the annual amount of electricity produced by the photovoltaic system (kWh per year) and discounted, results in the Present Value (PV):

$$PV = \sum_{t=1}^{T} \left[ (\text{Levelized Value})(E_t) \left( \frac{1}{1+r} \right)^t \right] \quad (66)$$

Assuming a constant photovoltaic system output degradation of $d^{PV}$ per year:

$$PV = \sum_{t=1}^{T} \left[ (\text{Levelized Value}) \frac{E_1 (1-d^{PV})^{t-1}}{(1+r)^t} \right] \quad (67)$$

and simplifying results in:

$$PV = \frac{(\text{Levelized Value})(E_1)\left[1 - \left(\frac{1-d^{PV}}{1+r}\right)^T\right]}{(r+d^{PV})} \quad (68)$$

Equation (68) can then be solved in terms of Levelized Value. The Levelized Value equals the Present Value divided by the amount of electricity produced in the first year times a levelization factor:

$$LV = \left(\frac{\text{Present Value}}{E_1}\right) \frac{(r+d^{PV})}{(1-d^{PV})\left[1-\left(\frac{1-d^{PV}}{1+r}\right)\right]} \alpha = \frac{\eta_*}{e^{rt}G_*^0} \quad (69)$$

If degradation is neglected, the levelization factor can be simplified:

$$LV = \left(\frac{\text{Present Value}}{E_1}\right) \frac{r(1+r)^T}{[(1+r)^T - 1]} \quad (70)$$

Finally, total value is determined by summing results across each of the value components. Each value component, as calculated in Present Value terms, ($), can be converted to Value ($ per kWh). Table 14 and Table 15 respectively present results for distributed photovoltaic power production and centralized photovoltaic power production. The tables break out the value in terms of the Economic Value and the Technical Load Match and Loss Savings.

While the invention has been particularly shown and described as referenced to the embodiments thereof, those skilled in the art will understand that

TABLE 14

|  | Economic Value ($/kWh) | Load Match (No Losses) (%) | Distributed Loss Savings (%) | Distributed PV Value ($/kWh) |
|---|---|---|---|---|
| Avoided Fuel Cost | $0.050 |  | 10% | $0.055 |
| Avoided Plant O&M Cost | $0.013 |  | 10% | $0.014 |
| Avoided Gen. Capacity Cost | $0.042 | 80% | 18% | $0.040 |
| Avoided Reserve Capacity Cost | $0.002 | 80% | 18% | $0.002 |
| Avoided T&D Capacity Cost | $0.036 | 50% | 9% | $0.020 |
| Avoided Environmental Cost | $0.030 |  | 0% | $0.030 |
| Fuel Price Guarantee Value | $0.036 |  | 10% | $0.040 |
|  | $0.219 |  |  | $0.211 |

TABLE 15

|  | Economic Value ($/kWh) | Load Match (No Losses) (%) | Distributed Loss Savings (%) | Distributed PV Value ($/kWh) |
|---|---|---|---|---|
| Avoided Fuel Cost | $0.050 |  | 0% | $0.050 |
| Avoided Plant O&M Cost | $0.013 |  | 0% | $0.013 |
| Avoided Gen. Capacity Cost | $0.042 | 80% | 0% | $0.034 |
| Avoided Reserve Capacity Cost | $0.002 | 80% | 0% | $0.002 |
| Avoided T&D Capacity Cost | $0.036 | 0% | 0% | $0.000 |
| Avoided Environmental Cost | $0.030 |  | 0% | $0.030 |
| Fuel Price Guarantee Value | $0.036 |  | 0% | $0.036 |
|  | $0.219 |  |  | $0.174 | the foregoing and other changes in form and detail may be made therein without departing from the spirit and scope.

What is claimed is:

1. A method for centralized power generation with the aid of a digital computer comprising the steps of:
   providing a computer with a time series of readings of centralized power generation for a power generation plant recorded at regular intervals over an initial period of power consumption;
   providing the computer with a time series of readings of distributed photovoltaic power production also recorded at the regular intervals over the initial period
   determining, by the computer, losses associated with the centralized power generation;
   equating, by the computer, the centralized power generation readings and the distributed photovoltaic power production readings as reflective of initial customer demand;
   estimating, by the computer, customer demand, beginning with the initial period, over a plurality of successive forecast periods, for each forecast period, comprising:
   determining, by the computer, the distributed photovoltaic power production proportioned at an increased rate of growth over the prior forecast period and forecasting, by the computer, distributed photovoltaic power production at each regular interval for the forecast period;
   determining, by the computer, the losses associated with the centralized power generation proportioned at an increased rate of growth over the prior forecast period and forecasting, by the computer, losses at each regular interval for the forecast period; and
   determining, by the computer, the customer demand proportioned at an increased rate of growth over the prior forecast period and forecasting, by the computer, centralized power generation with distributed photovoltaic power production to meet the increased customer demand at each regular interval for the forecast period, less the forecasted distributed photovoltaic power production plus the forecasted losses, both at each corresponding regular interval of the forecast period,
   providing the centralized power generation with distributed photovoltaic power production that was forecasted to meet the increased customer demand for the plurality of successive forecast periods to a production output controller for the power generation plant; and
   during each forecast period, operating the production output controller for the power generation plant to generate sufficient power to meet the centralized power generation with distributed photovoltaic power production that was forecasted.

2. A method according to claim 1, further comprising the steps of:
   maintaining, by the computer, the distributed photovoltaic power production over the prior forecast period and forecasting by the computer distributed photovoltaic power production with no additional distributed photovoltaic power production at each regular interval for the forecast period; and
   forecasting, by the computer, centralized power generation with no additional distributed photovoltaic power production to meet the increased customer demand at each regular interval for the forecast period, less the forecasted distributed photovoltaic power production with no additional photovoltaic power production, plus the forecasted losses, both at each corresponding regular interval of the forecast period.

3. A method according to claim 2, further comprising the step of:
   forecasting, by the computer, centralized power generation with centralized photovoltaic power production to meet the increased customer demand at each regular interval for the forecast period as the difference of the forecasted centralized power generation with no additional distributed photovoltaic power production and the forecasted centralized power generation with distributed photovoltaic power production.

4. A method according to claim 3, further comprising at least one of the steps of:
   matching, by the computer, the centralized power generation with distributed photovoltaic power production to a customer demand load of the forecasted centralized power generation with no additional distributed photovoltaic power production; and
   matching, by the computer, the centralized power generation with centralized photovoltaic power production to a customer demand load of the forecasted centralized power generation with no additional distributed photovoltaic power production.

5. A method according to claim 4, further comprising at least one of the steps of:
   evaluating, by the computer, the customer demand load match through an effective load carrying capacity analysis comprising statistically analyzing by the computer a time series of the centralized power generation with distributed photovoltaic power production and a time series of the centralized power generation with no additional distributed photovoltaic power production for each forecast period; and
   evaluating, by the computer, the customer demand load match through an effective load carrying capacity analysis comprising statistically analyzing by the computer a time series of the centralized power generation with centralized photovoltaic power production and a time series of the centralized power generation with no additional distributed photovoltaic power production for each forecast period.

6. A method according to claim 5, further comprising the step of:
   calculating the effective load carrying capacity for the centralized power generation with distributed photovoltaic power production $ELCC^{t, Distributed\ PV}$ for the forecast period t in accordance with:

$$ELCC^{t,Distributed\ PV} = m\ln\left\{\frac{\sum_{h=1}^{8760}\exp\left[-\frac{(G_{Peak}^{t,w/o\ PV} - G_h^{t,w/o\ PV})}{m}\right]}{\sum_{h=1}^{8760}\exp\left[-\frac{(G_{Peak}^{t,w/o\ PV} - G_h^{w/Distributed\ PV})}{m}\right]}\right\}$$

where m represents the Garver characteristic; h represents a regular interval within the forecast period; $G_{Peak}^{t,w/o\ PV}$ represents the forecasted centralized power generation with no additional distributed photovoltaic power production at peak load during the forecast period; $G_h^{t,w/o\ PV}$ represents the forecasted centralized power generation with no additional distributed photovoltaic power production at interval h during the forecast period; and $G_h^{w/\ Distributed\ PV}$ represents the forecasted centralized power generation with distributed photovoltaic power production at interval h during the forecast period.

7. A method according to claim 5, further comprising the step of
   calculating the effective load carrying capacity for the centralized power generation with centralized photovoltaic power production $ELCC^{t, Centralized\ PV}$ for the forecast period t in accordance with:

$$ELCC^{t,Centralized\ PV} = m\ln\left\{\frac{\sum_{h=1}^{8760}\exp\left[-\frac{(G_{Peak}^{t,w/o\ PV} - G_h^{t,w/o\ PV})}{m}\right]}{\sum_{h=1}^{8760}\exp\left[-\frac{(G_{Peak}^{t,w/o\ PV} - G_h^{w/Centralized\ PV})}{m}\right]}\right\}$$

where m represents the Garver characteristic; h represents a regular interval within the forecast period; $G_{Peak}^{t,w/o\ PV}$ represents the forecasted centralized power generation with no additional distributed photovoltaic power production at peak load during the forecast period; $G_h^{t,w/o\ PV}$ represents the forecasted centralized power generation with no additional distributed photovoltaic power production at interval h during the forecast period; and $G_h^{w/\ Centralized\ PV}$ represents the forecasted centralized power generation with centralized photovoltaic power production at interval h during the forecast period.

8. A method according to claim 4, further comprising at least one of the steps of:
   evaluating, by the computer, the customer demand load match through a peak load reduction analysis comprising analyzing, by the computer, the forecasted centralized power generation with distributed photovoltaic power production at peak load for each forecast period and the centralized power generation with no additional distributed photovoltaic power production at peak load for each forecast period; and
   evaluating, by the computer, the customer demand load match through a peak load reduction analysis comprising analyzing, by the computer, the forecasted centralized power generation with centralized photovoltaic power production at peak load for each forecast period and the centralized power generation with no additional distributed photovoltaic power production at peak load for each forecast period.

9. A method according to claim 8, further comprising the step of:
   calculating the peak load reduction for the centralized power generation with distributed photovoltaic power production $PLR^{t, Distributed\ PV}$ for the forecast period t in accordance with:

$PLR^t = \max\{G_1^{t,w/o\ PV}, G_2^{t,w/o\ PV}, \ldots, G_{8760}^{t,w/o\ PV}\} - \max\{G_1^{w/\ Distributed\ PV}, G_2^{w/\ Distributed\ PV}, \ldots, G_{8760}^{w/\ Distributed\ PV}\}$ where $G_h^{t,w/o\ PV}$ represents the forecasted centralized power generation with no additional distributed photovoltaic production at regular interval h, such that $1 \le h \le 8760$; and $G_h^{w/\ Distributed\ PV}$ the forecasted centralized power generation with distributed photovoltaic power production at regular interval h, such that $1 \le h \le 8760$.

10. A method according to claim 8, further comprising the step of:
    calculating the peak load reduction for the centralized power generation with centralized photovoltaic power production $PLR^{t, Centralized\ PV}$ for the forecast period r in accordance with:

$PLR^t = \max\{G_1^{t,w/o\ PV}, G_2^{t,w/o\ PV}, \ldots, G_{8760}^{t,w/o\ PV}\} - \max\{G_1^{w/\ Centralized\ PV}, G_2^{w/\ Centralized\ PV}, \ldots, G_{8760}^{w/\ Centralized\ PV}\}$ where $G_h^{t,w/o\ PV}$ represents the forecasted centralized power generation with no additional distributed photovoltaic power production at regular interval h, such that 1≤h≤8760; and $G_h^{w/\,Centralized\,PV}$ the forecasted centralized power generation with centralized photovoltaic power production at regular interval h, such that 1≤h≤8760.

11. A method according to claim 4, further comprising at least one of the steps of:
    expressing loss savings, by the computer, as a function of the customer demand load match of the centralized power generation with distributed photovoltaic power production in light of the centralized power generation with no additional distributed photovoltaic power production; and
    expressing loss savings, by the computer, as a function of the customer demand load match of the centralized power generation with centralized photovoltaic power production customer demand load in light of the centralized power generation with no additional distributed photovoltaic power production.

12. A method according to claim 11, further comprising the steps of:
    factoring the customer demand load match of the centralized power generation with distributed photovoltaic power production into the operation of the power generation plant in terms of load match over one or more of avoided generation capacity cost, avoided reserve capacity cost, and avoided transmission and distribution capacity cost; and
    factoring the loss savings of the centralized power generation with distributed photovoltaic power production into the operation of the power generation plant in terms of loss savings over one or more of avoided fuel cost, avoided plant operation and management cost, avoided generation capacity cost, avoided reserve capacity cost, avoided transmission and distribution capacity cost, avoided environmental cost, and fuel price guarantee value.

13. A method according to claim 11, further comprising the step of:
    factoring the customer demand load match of the centralized power generation with centralized photovoltaic power production into the operation of the power generation plant in terms of load match over one or more of avoided generation capacity cost, avoided reserve capacity cost, and avoided transmission and distribution capacity cost; and
    factoring the loss savings of the centralized power generation with centralized photovoltaic power production into the operation of the power generation plant in terms of loss savings over one or more of avoided fuel cost, avoided plant operation and management cost, avoided generation capacity cost, avoided reserve capacity cost, avoided transmission and distribution capacity cost, avoided environmental cost, and fuel price guarantee value.

14. A method according to claim 11, further comprising the step of:
    calculating the loss savings Loss Savings$^t$ for the forecast period t in accordance with:

$$\text{Loss Savings}^t = \frac{ELCC^{t,Distributed\,PV}}{ELCC^{t,Central\,PV}} - 1$$

where $ELCC^{t,Distributed\,PV}$ represents the effective load carrying capacity for the forecasted centralized power generation with distributed photovoltaic power production during the forecast period; and $ELCC^{t,Central\,PV}$ represents the effective load carrying capacity for the forecasted centralized power generation with centralized photovoltaic power production during the forecast period.

15. A method according to claim 1, further comprising the step of:
    calculating the forecasted losses $L_h^t$ for the regular interval h for the forecast period t in accordance with:

$$L_h^t = \left(\frac{\eta_*}{e^{rt}G_*^0}\right)(G_h^t)^2$$

where $L_h^t$ represents average power-related losses at one instant in time during the forecast period; $\eta_*$ represents average power-related losses as a percentage at one instant in time during the initial period; $e^{rt}$ represents exponential growth during the forecast period, where r is a rate of customer demand growth; $G_*^0$ represents the centralized power generation at one instant in time during the initial period; and $G_h^t$ represents the centralized power generation at one instant in time during the forecast period.

16. A method according to claim 1, further comprising the step of:
    calculating the forecasted distributed photovoltaic power production $g_h^t$ for the regular interval h for the forecast period t in accordance with:

$$g_h^t = C^t \hat{g}_h^0$$

where $C^t$ represents the distributed photovoltaic power production capacity during the forecast period; and $\hat{g}_h^0$ represents the time series of the readings of distributed photovoltaic power production during the initial period, such that normalization is relative to the distributed photovoltaic power production capacity during the initial period $C^0$.

17. A method according to claim 1, further comprising the step of:
    correlating, by the computer, the photovoltaic production readings and the centralized power generation readings in their respective time series by their regular intervals and regional locations.

18. A method according to claim 1, further comprising the steps of:
    calculating the forecasted centralized power generation $G_h^t$ for the regular interval h for the forecast period t in accordance with:

$$G_h^t = \left(\frac{G_*^0 e^{rt}}{2\eta_*}\right)\left[1 - \sqrt{1 + 4\eta_*\left[\frac{\eta_*}{e^{rt}}(\hat{G}_h^0)^2 - \hat{G}_h^0 + R\hat{g}_h^0\right]}\right]$$

such that:

$$R = \left(\frac{C^0}{G_*^0}\right)\left(\frac{C^t}{C^0}e^{-rt} - 1\right)$$

where $G_*^0$ represents centralized power generation at one instant in time during the initial period; $e^{rt}$ represents exponential growth during the forecast period, where r is a rate of customer demand growth; $\eta_*$ represents average power-related losses as a percentage at one instant in time during the initial period; $\hat{G}_h^0$ represents the time series of the readings of centralized power generation during the initial period, such that normalization is relative to the centralized power generation at one instant in time during the initial period $G_*^0$; $C^0$ represents the distributed photovoltaic power production capacity during the initial period; $C^t$ represents the distributed photovoltaic power production capacity during the forecast period; and $\hat{g}_h^0$ represents the time series of the readings of distributed photovoltaic power production during the initial period, such that normalization is relative to the distributed photovoltaic power production capacity during the initial period $C^0$.

19. A method according to claim 1, further comprising the step of:
   providing the computer with the readings of distributed photovoltaic power production as measured from actual photovoltaic production over the initial period.

20. A method according to claim 1, further comprising the step of:
   providing the computer with the readings of distributed photovoltaic power production as simulated from a time series of a set of the sky clearness indexes regularly measured over the initial period.

21. A method according to claim 20, further comprising the steps of:
   providing the computer with raw measured irradiance from ground-based weather stations;
   assembling irradiance observations, by the computer, as point statistics, each comprising an average of all values of the raw measured irradiance; and
   determining, by the computer, the distributed photovoltaic power production using the point statistics.

22. A method according to claim 20, further comprising the step of:
   setting the set of sky clearness indexes as a ratio of each irradiance observation in a set of irradiance observations that has been regularly measured for a plurality of locations, which are each within a geographic region suitable for operation of a photovoltaic power production fleet, and clear sky irradiance;
   forming, by the computer, a time series of the set of the sky clearness indexes for all of the locations within the geographic region;
   determining, by the computer, fleet irradiance statistics for the photovoltaic power production fleet through statistical evaluation of the time series of the set of the sky clearness indexes; and
   determining, by the computer, the distributed photovoltaic power production for the photovoltaic fleet as a function of the fleet irradiance statistics and an overall power rating of the photovoltaic power production fleet.

23. A method according to claim 22, further comprising the steps of:
   providing the computer with area solar irradiance statistics, each comprising a set of pixels from satellite imagery for a physical area within the geographic region;
   converting, by the computer, the area solar irradiance statistics into irradiance statistics for an average point within the set of pixels;
   evaluating, by the computer, an area function for each pixel by solving a discrete correlation coefficient matrix comprising correlation coefficients between point clearness indexes selected for pairs of the points in a satellite pixel; and
   setting, by the computer, the measured irradiance observations as the solution to the discrete correlation coefficient matrix.

24. A method according to claim 22, further comprising the steps of:
   providing the computer with area solar irradiance statistics, each comprising a set of pixels from satellite imagery for a physical area within the geographic region;
   converting, by the computer, the area solar irradiance statistics into irradiance statistics for an average point within the set of pixels;
   evaluating, by the computer, an area function for each pixel by solving probability density function based on a distance for pairs of the points in a satellite pixel comprising solving an integral of the probability density function for the distance as a multiple of a correlation coefficient function at the distance; and
   setting, by the computer, the measured irradiance observations as the solution to the probability density function.

25. A method according to claim 1, further comprising the steps of:
   calculating the forecasted distributed photovoltaic power production $E^{t,Distributed\ PV}$ for the forecast period t in accordance with:

$$E^{t,Distributed\ PV} = \sum_{h=1}^{8,760} E_h^{t,Distributed\ PV}$$

such that:

$$E_h^{t,Distributed\ PV} = G_h^{t,w/o\ PV} - G_h^{t,w/\ Distributed\ PV}$$

where $G_h^{t,w/o\ PV}$ represents the forecasted centralized power generation with no additional distributed photovoltaic power production at regular interval h; and $G_h^{t,w/\ Distributed\ PV}$ represents the forecasted centralized power generation with distributed photovoltaic power production at regular interval h;
   calculating the forecasted centralized power generation production $E^{t,Central\ PV}$ for the forecast period t in accordance with:

$$E^{t,Central\ PV} = \sum_{h=1}^{8,760} E_h^{t,Central\ PV}$$

such that:

$$E_h^{t,Central\ PV} = G_h^{t,w/o\ PV} - G_h^{t,w/\ Central\ PV}$$

where $G_h^{t,w/o\ PV}$ represents the forecasted centralized power generation with no additional distributed photovoltaic power production at regular interval h; and $G_h^{t,w/\ Central\ PV}$ represents the forecasted centralized power generation with centralized photovoltaic power production at regular interval h; and
   calculating the loss savings Loss Savings$^t$ for energy generation for the forecast period t in accordance with:

$$\text{Loss Savings}^t = \frac{E^{t,Distributed\ PV}}{E^{t,Central\ PV}} - 1.$$

26. A method according to claim 1, further comprising the steps of:
   calculating the avoided fuel cost AFC for the centralized power generation with distributed photovoltaic power production for the forecast period t in accordance with:

$$AFC = E^1 H^1 \sum_{t=1}^{T} \left[ \frac{P_{NG}^t}{(1+r)^t} \right] \left( \frac{1 - d_{PV}}{1 - d_{CCGT}} \right)^{t-1}$$

where $E^1$ represents the forecasted distributed photovoltaic power production for the first forecast period; $H^1$ represents a heat rate for a combined-cycle combustion gas turbine power generation utility; $P_{NG}^t$ represents the set of annual natural gas prices over t years; $d_{PV}$ represents the annual degradation of the photovoltaic production capacity; $d_{CCGT}$ represents the annual degradation of the combined-cycle combustion gas turbine capacity; and r represents a nominal discount rate; and
  including the avoided fuel cost as an economic assessment with the loss savings.

27. A method according to claim 1, further comprising the steps of:
  calculating the avoided plant operations and maintenance (O&M) cost AO&MC for the centralized power generation with distributed photovoltaic power production for the forecast period t in accordance with:

$$AO\&MC = E^1 \Delta OM^1 \sum_{t=1}^{T} \frac{(1 + e_{OM})^{t-1}}{(1+r)^t} \left( \frac{1 - d_{PV}}{1 - d_{CCGT}} \right)^{t-1}$$

where $E^1$ represents the forecasted distributed photovoltaic power production for the first forecast period; $\Delta OM^1$ represents an operations and maintenance cost difference between a combined-cycle combustion gas turbine power generation utility and a photovoltaic power production fleet for the first forecast period; $d_{PV}$ represents the annual degradation of the photovoltaic production capacity; $d_{CCGT}$ represents the annual degradation of the combined-cycle combustion gas turbine capacity; and r represents a nominal discount rate; and
  including the avoided plant operations and maintenance cost as an economic assessment with the loss savings.

28. A method according to claim 1, further comprising the steps of:
  calculating the avoided generation capacity cost AGCC for the forecast period t in accordance with:
    $AGCC = (C_G)(M)$ where $C_G$ represents a fully loaded capital cost of generation; and M represents the effective load carrying capacity; and
  including the avoided generation capacity cost as an economic assessment with the loss savings.

29. A method according to claim 1, further comprising the steps of:
  calculating the avoided reserve capacity cost ARCC for the forecast period t in accordance with:
    $ARCC = (RM)(C_G)(M)$ where RM represents a reserve margin; $C_G$ represents a fully loaded capital cost of generation; and M represents an effective load carrying capacity; and
  including the avoided reserve capacity cost as an economic assessment with the loss savings.

30. A method according to claim 1, further comprising the steps of:
  calculating the avoided transmission and distribution capacity cost AT&DCC for the forecast period t in accordance with:

$$AT\&DCC = \left( \frac{C_{T\&D}}{L} \right) \left( \frac{r - e_{T\&D}}{1+r} \right) (M)$$

where $C_{T\&D}$ represents a present value of transmission and distribution upgrade cost over years; L represents annual transmission and distribution system load growth; $e_{T\&D}$ represents a transmission and distribution system upgrade cost escalation rate; r represents a nominal discount rate; and M represents the peak load reduction; and
  including the avoided transmission and distribution capacity cost as an economic assessment with the loss savings.

31. A method according to claim 1, further comprising the steps of:
  calculating the fuel price guarantee value FPGV for the forecast period t in accordance with:

$$FPGV = E_1 H_1 \left\{ \sum_{t=1}^{T} \frac{P_{NG\,Futures}^t \left[ 1 - \left( \frac{1 + r_{risk-free}^t}{1+r} \right)^t \right]}{\left( 1 + r_{risk-free}^t \right)^t} \right\}$$

where $P_{NG\,Futures}^t$ represents a set of annual natural gas price futures contracts over t years; r represents a nominal discount rate; $r_{risk-free}$ represents a risk-free rate; $E^1$ represents the forecasted distributed photovoltaic power production for the first forecast period; and T represents a photovoltaic system life; and
  including the fuel price guarantee value as an economic assessment with the loss savings.

32. A method according to claim 1, further comprising the steps of:
  calculating the avoided environmental cost AEVC for the forecast period t in accordance with:

$$AEVC = E^t P_{REC}^1 \sum_{t=1}^{T} \frac{[(1 + e_{REC})(1 - d_{PV})]^{t-1}}{(1+r)^t}$$

where $E^1$ represents the forecasted distributed photovoltaic power production; $P_{REC}$ represents a renewable energy credits price; $e_{REC}$ represents a price escalation rate applicable to the $P_{REC}$; $d_{PV}$ represents photovoltaic degradation; r represents a nominal discount rate; and T represents a photovoltaic system life; and
  including the avoided environmental cost as an economic assessment with the loss savings.

\* \* \* \* \*